(12) United States Patent
Horiuchi et al.

(10) Patent No.: US 10,599,440 B2
(45) Date of Patent: Mar. 24, 2020

(54) METHOD FOR SHARING PROCESSING MODULES BETWEEN PIPELINES

(71) Applicant: INTERNATIONAL BUSINESS MACHINES CORPORATION, Armonk, NY (US)

(72) Inventors: Yoshio Horiuchi, Hiratsuka (JP); Isao Kadowaki, Yokohama (JP); Masaki Saitoh, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 15/854,871

(22) Filed: Dec. 27, 2017

(65) Prior Publication Data

US 2019/0196880 A1      Jun. 27, 2019

(51) Int. Cl.
*G06F 9/38* (2018.01)
*G06F 9/54* (2006.01)
*G06F 9/50* (2006.01)
*G06F 9/48* (2006.01)

(52) U.S. Cl.
CPC .......... *G06F 9/3867* (2013.01); *G06F 9/4881* (2013.01); *G06F 9/5083* (2013.01); *G06F 9/544* (2013.01)

(58) Field of Classification Search
CPC ...... G06F 9/5083; G06F 9/544; G06F 9/4881; G06F 9/3867
See application file for complete search history.

(56) References Cited

U.S. PATENT DOCUMENTS

| 8,036,921 | B2 | 10/2011 | Kumar et al. |
| 9,110,689 | B2 * | 8/2015 | Lecler ................... G06F 17/505 |
| 9,401,875 | B2 | 7/2016 | Yasuda et al. |
| 9,535,707 | B2 | 1/2017 | Branson et al. |
| 10,067,703 | B2 | 9/2018 | Barsness et al. |
| 2013/0019849 | A1 | 1/2013 | Zillmer et al. |
| 2013/0227573 | A1 | 8/2013 | Morsi et al. |
| 2015/0121396 | A1* | 4/2015 | Martinez Canedo ...................... G06F 8/4452 718/105 |
| 2015/0316972 | A1 | 11/2015 | Chen et al. |

(Continued)

OTHER PUBLICATIONS

Gavrilovska et al., "Application and Multidisciplinary Aspects of Wireless Sensor Networks", Concepts, Integration, and Case Studies, Computer Communications and Networks, Springer, © Springer-Verlag London Limited 2011, 279 pages.

(Continued)

*Primary Examiner* — Jacob D Dascomb
(74) *Attorney, Agent, or Firm* — Patterson + Sheridan, LLP

(57) ABSTRACT

Provided is a method, wherein the system includes an existing pipeline having at least one processing module that is activated and information relating to the existing pipeline. The system operating method includes detecting a processing module to be shared that is shared with the existing pipeline, among the processing modules included in a new pipeline that is newly activated or in an activated pipeline that is already activated; and connecting a non-shared processing module that is not the processing module to be shared, among the processing modules included in the new pipeline or in the activated pipeline, to a shared processing module corresponding to the processing module to be shared in the existing pipeline.

20 Claims, 28 Drawing Sheets

(56) References Cited

U.S. PATENT DOCUMENTS

2017/0063532 A1* 3/2017 Bhattacharyya ...... H04L 9/0637
2017/0168748 A1   6/2017 Barsness et al.
2018/0367460 A1* 12/2018 Gao ..................... G06F 9/5066
2019/0196880 A1   6/2019 Horiuchi et al.

OTHER PUBLICATIONS

IBM, "List of IBM Patents or Patent Applications Treated as Related," for U.S. Appl. No. 15/854,871, filed Dec. 27, 2017.

* cited by examiner

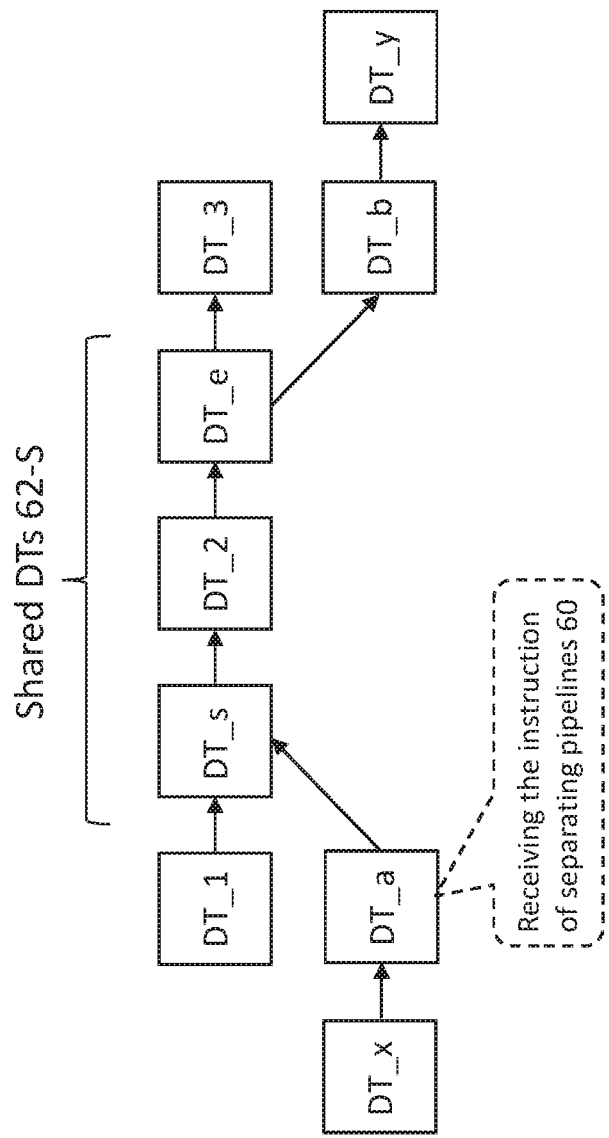

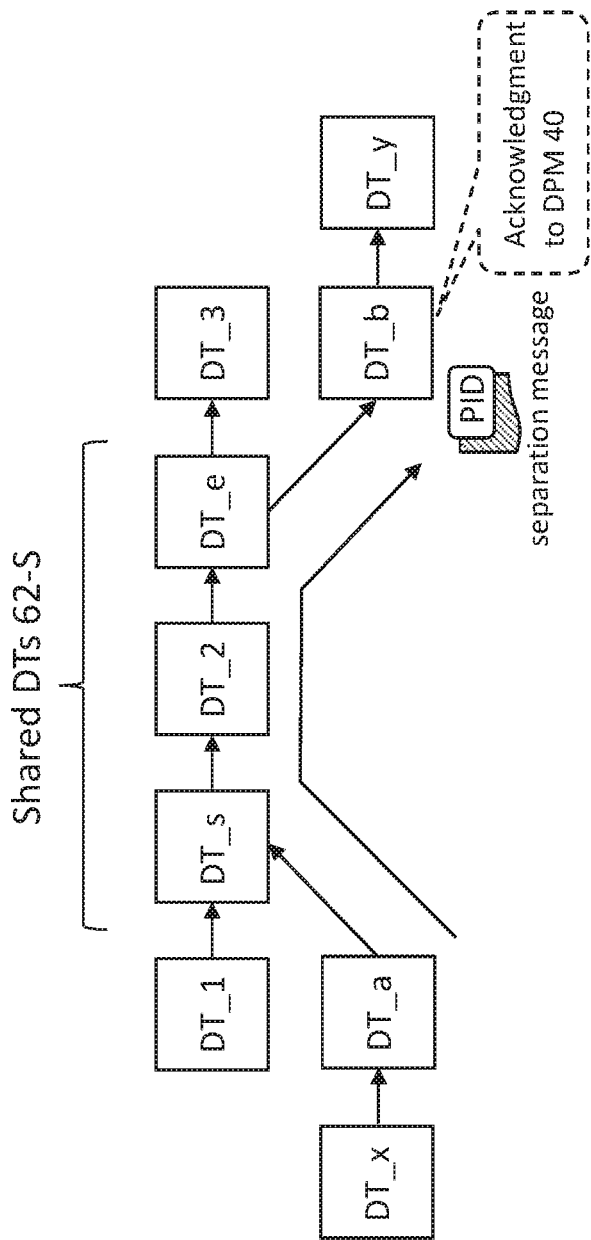

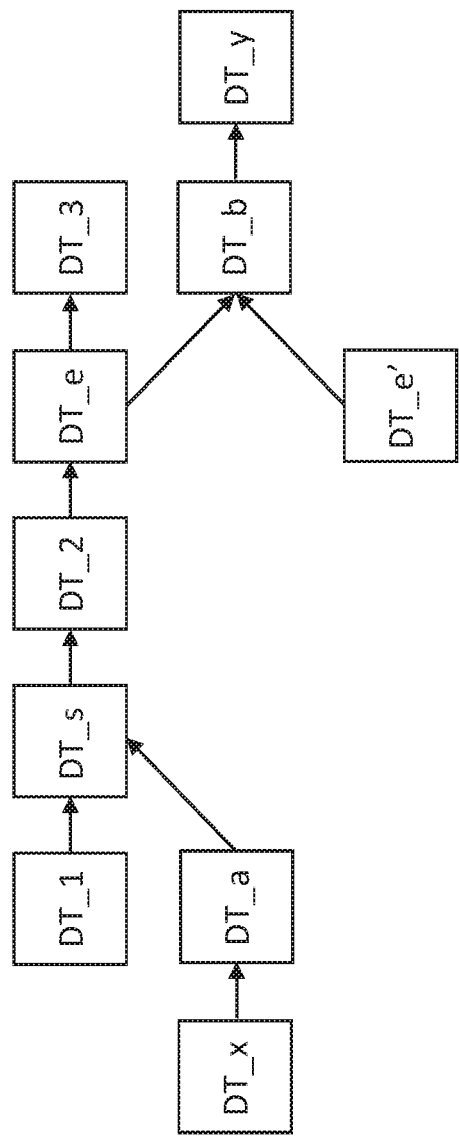

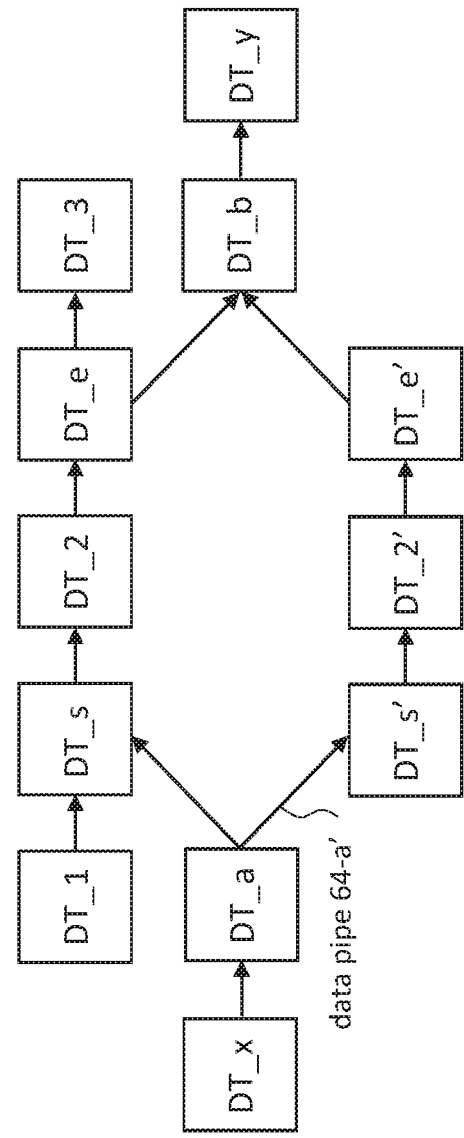

METHOD FOR SHARING PROCESSING MODULES BETWEEN PIPELINES

BACKGROUND

The present invention relates to a method for sharing processing modules between pipelines.

It has been known that a data transformation technique is reused and extended to a plurality of users at a single time. It has been also known that data transformers provided by SenseWeb, which is an infrastructure for sharing information generated by globally distributed sensor networks, are shared across multiple applications and link themselves between applications and a coordinator. However, there has been no on-demand re-use of an already activated data transformer when, for example, activating a new data pipeline.

SUMMARY

According to one embodiment, a system operating method is provided, whereby the system includes an existing pipeline having at least one processing module that is activated and information relating to the existing pipeline, the system operating method comprising: detecting a processing module to be shared that is shared with the existing pipeline, among the processing modules included in a new pipeline that is newly activated or in an activated pipeline that is already activated; and connecting a non-shared processing module that is not the processing module to be shared, among the processing modules included in the new pipeline or in the activated pipeline, to a shared processing module corresponding to the processing module to be shared in the existing pipeline. Also provided are a system and a computer program product. The system may be operable to share already existing processing modules in the existing pipeline on demand, when sharing a processing module between the new pipeline or the activated pipeline and the existing pipeline. The processing modules to be shared are reused processing modules. The system may be operable to shorten the activation time of the new pipeline and/or to reduce the resources consumed by the system including the pipelines, by reducing the number of processing modules created in the pipelines.

According to another embodiment, provided is a system operating method including, in advance, information indicating whether sharing with a pipeline differing from the existing pipeline is allowed, for at least one processing module among the processing modules included in the existing pipeline. The system may be operable to determine the shareability of processing modules according to the wishes of a customer already using the pipelines.

According to another embodiment, provided is a system operating method comprising acquiring information relating to a current load in at least one processing module among the processing modules included in the existing pipeline; and determining the shared processing module based on the information relating to the current load. The system may be operable to prevent a drop in the processing speed of all of the pipelines that share processing modules to be shared with large loads, by preventing the sharing of the processing modules with large loads between the pipelines.

According to another embodiment, provided is a system operating method in which the system includes a first activated pipeline and a second activated pipeline, and the system operating method comprises, in a case where a plurality of the processing modules to be shared are detected, if at least some candidate modules that can possibly become the shared processing module are included in both the first activated pipeline and the second activated pipeline, selecting all of the shared processing modules corresponding to a plurality of the processing modules to be shared from either one of the first activated pipeline and the second activated pipeline. The system can reduce the work of changing connections of the data pipes, compared to a case in which the processing modules to be shared are selected from both the first activated pipeline and the second activated pipeline, and therefore may be operable to realize sharing between the pipelines in a shorter time.

According to another embodiment, provided is a system operating method comprising, after the non-shared processing module and the shared processing module are connected, inputting a separation message for separating from the existing pipeline to the existing pipeline; and creating a separated pipeline that is separated from the existing pipeline on a condition that the processing module at a next downstream position from the processing module positioned farthest downstream among the shared processing modules, which are processing modules associated with the separated pipeline that is scheduled to be separated from the existing pipeline, has received the separation message. The system may be operable to create two pipelines separated from each other, by eliminating the sharing after processing modules have been shared in the two pipelines.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 6B shows an instruction issuing step corresponding to S210 of FIG. 5, according to an embodiment of the present invention;

FIG. 6D shows a receiving step corresponding to S230 of FIG. 5, according to an embodiment of the present invention;

FIG. 6F shows a data transformer creation corresponding to S250 of FIG. 5, according to an embodiment of the present invention;

FIG. 6H shows a data pipeline creation step corresponding to S270 of FIG. 5, according to an embodiment of the present invention;

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Figure 1:
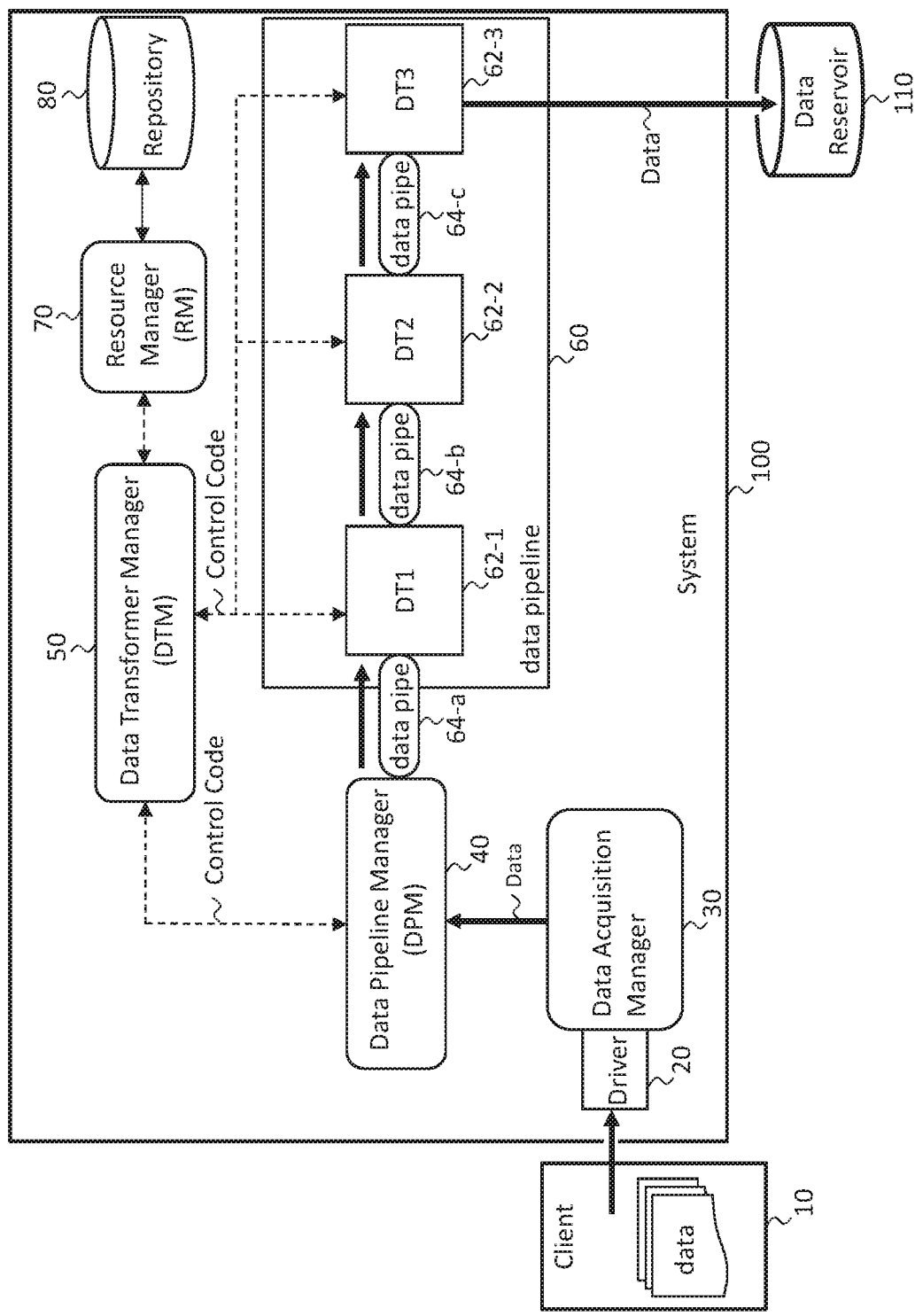
FIG. 1 shows an exemplary configuration of a system 100 according to an embodiment of the present invention.

FIG. 1 shows an exemplary configuration of a system 100 according to an embodiment of the present invention. The system 100 in the present example receives data from a client computer 10, applies a prescribed process to this data, and then stores the processed data in a data reservoir 110. In FIG. 1, the solid line arrow shows the flow of data that is to be processed or that has been processed, and the dashed line arrow shows the flow of information such as control code.

The system 100 in the present example includes a data acquisition driver 20, a data acquisition manager (DAM) 30, a data pipeline manager (DPM) 40, a data transformer manager (DTM) 50, a data pipeline 60, a resource manager (RM) 70, and a repository 80. The data pipeline 60 may include one or more data pipes 64 and one or more data transformers 62. Each data transformer (DT) 62 may be an example of a data processing module.

The data acquisition manager (DAM) 30 may be operable to manage the client computer 10 by using the data acquisition driver 20. The data acquisition manager (DAM) 30 in the present example manages connection and communication between the system 100 and the client computer 10, and acquires data from the client computer 10. In one example, the client computer 10 is a computer installed in a medical institution and the data is medical information and patient information sequentially transmitted from the medical institution, but the present invention is not limited to the present example.

The data acquisition manager (DAM) 30 may be operable to absorb the difference in data among a plurality of client computers 10. For example, the data acquisition manager (DAM) 30 absorbs protocol differences and/or data format differences among the client computers 10. In this way, the data acquisition manager (DAM) 30 may transform the data acquired from a client computer 10 into data suitable for processing in the data pipeline 60. The data acquisition manager (DAM) 30 may transmit this converted data to the data pipeline manager (DPM) 40.

The data pipeline manager (DPM) 40 may be operable to configure the data pipeline 60 based on information contained in the data. For example, the data pipeline manager (DPM) 40 may create a data pipeline 60 in response to receiving data from the data acquisition manager (DAM) 30. The data pipeline 60 may include one or more data transformers 62 and one or more data pipes 64. The data pipeline manager (DPM) 40 may receive the data from the data acquisition manager (DAM) 30.

A path for exchanging information such as control code may be provided between the data pipeline manager (DPM) 40 and the data transformer manager (DTM) 50. A path for exchanging information such as control code may also be provided between the data transformer manager (DTM) 50 and each data transformer (DT) 62. The data pipeline manager (DPM) 40 may output a request for activating one or more of the data transformers (DT) 62 to the data transformer manager (DTM) 50 via this path. In this way, the data pipeline manager (DPM) 40 may create one or more data transformers (DT) 62.

The data transformer manager (DTM) 50 may be operable to manage each data transformer (DT) 62. The data transformer manager (DTM) 50 may control one or more of the data transformers (DT) 62 according to a control request from the data pipeline manager (DPM) 40. The data transformer manager (DTM) 50 may check the state of the activated data transformers (DT) 62 via the path. Each data transformer (DT) 62 uses middleware such as an IBM Integration Bus, IBM InfoSphere Data Stage, Apache Hadoop, or Apache Spark, or a custom java code process called Java Data Transformer (registered trademark). Each data transformer (DT) 62 may be arranged and executed dynamically on one or more servers. It is obvious that each data transformer (DT) 62 may be executed on a single server.

The resource manager (RM) 70 may be operable to monitor the state of the data transformers (DT) 62. The resource manager (RM) 70 may include a list and load information of the data transformers (DT) 62, which is information relating to the data pipelines 60, and may also include information relating to the shareability of specified data transformers (DT) 62.

For example, the resource manager (RM) 70 creates a list of data transformers (DT) 62. As another example, the resource manager (RM) 70 monitors the load information of the data transformers (DT) 62. As yet another example, the resource manager (RM) 70 may collect information concerning whether each data transformer (DT) 62 is a data transformer (DT) 62 that may be shared with another data pipeline 60. There are cases where a specified data transformer (DT) 62 in a data pipeline 60 is allowed to be used only by a specified customer, based on a contract. Therefore, there are cases where information relating to whether a specified data transformer (DT) 62 is shareable is necessary.

The repository 80 may be operable to hold the information of the data transformers (DT) 62 managed by the resource manager (RM) 70. For example, the repository 80 is a memory dedicated to the resource manager (RM) 70. The information transferred between the repository 80 and the resource manager (RM) 70 is indicated by the solid line arrows.

Each data transformer 62 may be operable to perform a different predetermined process on the data. Each data transformer 62 may be a processing unit for a processing stage in the data pipeline 60. Each data transformer 62 may require a different amount of time to process the data. The data pipeline 60 may be operable to sequentially process the data in the data transformers 62.

The data pipeline manager (DPM) 40 may be operable to manage the data pipes 64. The data pipeline manager (DPM) 40 may create the necessary data pipes 64 and delete the unnecessary data pipes 64. Each data pipe 64 may be a logical connection between data transformers (DT) 62. Each data pipe 64 may be realized by an IBM WebSphere MQ or Apache Kafka queue, or may be realized by TCP/IP. Each data pipe 64 may be operable to operate according to the FIFO (First In First Out) operational principle. Each data pipe 64 may be operable to transfer data from one data transformer 62 (or the data pipeline manager (DPM) 40) to another data transformer 62 that is adjacent thereto.

After creation of all of the data transformers (DT) 62 forming the data pipeline 60 has been completed and the data pipes 64 have been connected between the data pipeline manager (DPM) 40 and the data transformer (DT_1) 62-1 that is farthest upstream and between each data transformer (DT) 62, the data pipeline manager (DPM) 40 may transmit the data to the data pipeline 60. A data transformer (DT1) 62-1 that performs the first process in the data pipeline 60 may receive the data from the data pipeline manager (DPM) 40 via a data pipe 64-*a*. The data pipes 64 may be created or deleted by the data pipeline manager (DPM) 40.

After the data transformer (DT_1) 62-1 has performed the prescribed process, a data transformer (DT_2) 62-2 may receive the data from the data transformer (DT_1) 62-1 via a data pipe 64-*b*. In this way, each data transformers (DT) 62 may sequentially perform the prescribed processes on the data.

The data pipeline 60 in the present example includes three data transformers (DT) 62. The data pipeline 60 in the present example processes the data in the order of the data transformer (DT_1) 62-1, the data transformer (DT_2) 62-2, and a data transformer (DT_3) 62-3. However, it should be noted that the number of data transformers 62 included in the data pipeline 60 is not limited to three. The number of data transformers (DT) 62 may be greater than or equal to one.

In the present example, the data acquisition manager (DAM) 30, the data pipeline manager (DPM) 40, the data transformer manager (DTM) 50, the data transformers (DT) 62, and the data pipes 64 are all provided in the same computer, but one or more of these components may instead be provided in a different computer, or each of these components may be provided in a different computer. Furthermore, the data pipeline manager (DPM) 40 and one or more of the data transformers (DT) 62 may be provided in different computers. The one or more computers may be provided by a cloud environment. The one or more computers may be servers. The computers may be connected to each other by a network. In this case as well, the data pipes 64 can be suitably connected to the data transformers (DT) 62 in order to form the data pipeline 60.

Figure 2:
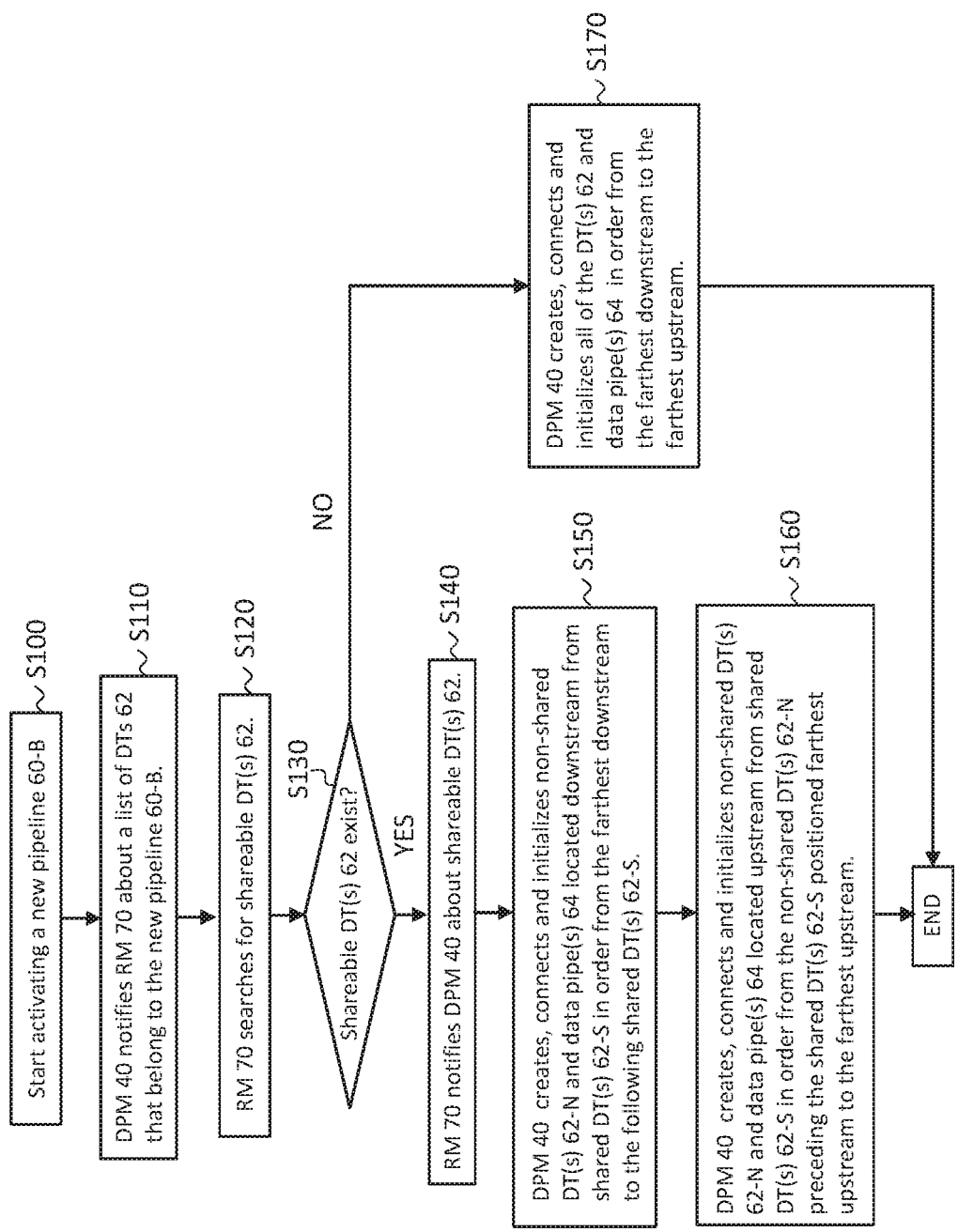
FIG. 2 shows an operational flow for sharing data transformers (DT) 62 according to a first embodiment.

FIG. 2 shows an operational flow for sharing data transformers (DT) 62 according to a first embodiment. This operational flow is one example of an operating method of the system 100. In the first embodiment, if an existing pipeline 60-A including at least one activated data transformer (DT) 62 already exists, the system 100 newly activates a new pipeline 60-B. At this time, data transformers (DT) 62 that are judged to be shareable between the existing pipeline 60-A and the new pipeline 60-B, according to prescribed conditions, may be shared.

S100 is a step for starting the activation of the new pipeline 60-B. When the new pipeline 60-B is activated, a data pipeline manager (DPM) 40 may determine a PID, which is an identification number (ID) of the new pipeline 60-B. The PID may be the ID of the new pipeline 60-B that includes a data transformer (DT) 62 that is shareable with the existing pipeline 60-A.

S110 is a step of the data pipeline manager (DPM) 40 notifying a resource manager (RM) 70 about a list of data transformers (DT) 62 included in the new pipeline 60-B. The list of data transformers (DT) 62 may include all of the data transformers (DT) 62 that form the new pipeline 60-B.

S120 is a step of the resource manager (RM) 70 searching for data transformers (DT) 62 that are shareable. The resource manager (RM) 70 may search for data transformers (DT) 62 that match all or some of the list described above, from among one or more existing pipelines 60-A. In other words, the resource manager (RM) 70 may search for shared data transformers (DT) 62-S in the new pipeline 60-B. In the present embodiment, shared data transformers (DT) 62-S refer to data transformers (DT) 62 that can be shared, i.e. are shareable, by the existing pipeline 60-A and the new pipeline 60-B, from among the data transformers (DT) 62 included in the newly activated new pipeline 60-B.

The resource manager (RM) 70 may determine data transformers (DT) 62 that fulfill the prescribed conditions to be the shared data transformers (DT) 62-S, by comparing information relating to the data transformers (DT) 62 provided as notification from the data pipeline manager (DPM) 40 and information relating to the existing pipeline 60-A. The prescribed conditions may be one or more types of information among information concerning the current load, sharing availability, past actual performance, and the load expected in the future for the data transformers (DT) 62 that are candidates to be shared data transformers (DT) 62-S.

As described above, the resource manager (RM) 70 may include information relating to the existing pipeline 60-A. For example, for at least one data transformer (DT) 62 among the plurality of data transformers (DT) 62 included in the existing pipeline 60-A, the resource manager (RM) 70 includes information indicating whether sharing with a data pipeline 60 differing from the existing pipeline 60-A is allowed. By determining the shared data transformers (DT) 62-S based on this information, it is possible to determine the sharing availability of processing modules according to the wishes of a customer already using the pipeline.

Furthermore, as an example, the resource manager (RM) 70 acquires information relating to the current load in at least one data transformer (DT) 62 among the plurality of data transformers (DT) 62 included in the existing pipeline 60-A. The resource manager (RM) 70 may sequentially update the information relating to the current load of the one or more data transformers (DT) 62 in the existing pipeline 60-A. In this way, if the shared data transformers (DT) 62-S are determined based on the information relating to the load, it is possible to prevent sharing data transformers (DT) 62 having large loads between different data pipelines 60. Accordingly, it is possible to prevent a drop in the processing speed of all of the data pipelines 60 that shared the shared data transformers (DT) 62-S having large loads.

Furthermore, as an example, the resource manager (RM) 70 acquires information relating to the past actual performance in at least one data transformer (DT) 62 among the data transformers (DT) 62 included in the existing pipeline 60-A. The resource manager (RM) 70 may determine the shared data transformers (DT) 62-S based on the information relating to the past actual performance of the data transformers (DT) 62. In this way, it is possible to reduce the possibility of a future processing error occurring in all of the data pipelines 60 that shared the shared data transformers (DT) 62-S.

Here, the past actual performance may include one or both of the continuous operating time of the data transformers (DT) 62 in the past and the number of processing errors that have occurred in the data transformers (DT) 62 in the past, for example. In the processing of the data pipelines 60, if it were assumed that a processing error occurs during data processing, all of the data that is a target of the processing, including the data for which processing has already been finished, would be affected by this processing error. Therefore, the past actual performance of the data transformers (DT) 62 can serve as a judgment standard directly connected to the reliability of the processing of the data pipelines 60.

Furthermore, as an example, the resource manager (RM) 70 determines the shared data transformers (DT) 62-S according to the expected load of data transformers (DT) 62 in the future. If an extremely large amount of data is currently being entered into a data transformer (DT) 62 positioned upstream even though there is a data transformer (DT) 62 whose current load is relatively small, the load of the data transformer (DT) 62 whose current load is relatively small is expected to increase sharply in the future. In this case, when the data transformer (DT) 62 whose current load is relatively small is set as a shared data transformer (DT) 62-S, there is a concern that there is a drop in the processing speed of all of the data pipelines 60 that shared the shared data transformer (DT) 62-S whose load is large. Therefore, data transformers (DT) 62 whose loads are expected to be small in the future may be set as shared data transformers (DT) 62-S. In this way, it is possible to prevent a situation in which there is a drop in the processing speed of all of the data pipelines 60 that shared the shared data transformers (DT) 62-S.

S130 is a step of branching according to the conditions. If the resource manager (RM) 70 does not detect any shareable data transformers (DT) 62 (NO in S130), the process moves to S170. S170 is a step of the data pipeline manager (DPM) 40 creating, connecting, and initializing all of the data transformers (DT) 62 and data pipes 64 included in the new pipeline 60-B in order from the farthest downstream to the farthest upstream, via the data transformer manager (DTM) 50. In this way, the activation of the new pipeline 60-B is ended.

In contrast to this, if the resource manager (RM) 70 detects shareable data transformers (DT) 62 that fulfill the prescribed conditions (YES at S130), the process moves to S140. S140 is a step of the resource manager (RM) 70 notifying the data pipeline manager (DPM) 40 about the determined shared data transformers (DT) 62-S.

S150 is a step of the data pipeline manager (DPM) 40 creating, connecting, and initializing non-shared data transformers (DT) 62-N and data pipes 64 positioned downstream from the shared data transformer (DT) 62-S, in order from the farthest downstream to whichever follows the shared data transformer (DT) 62-S. As described further below, in the present embodiment, DT_y and DT_b, which are non-shared data transformers (DT) 62-N, and data pipes 64-y and 64-b are created, connected, and initialized in order from downstream. The non-shared data transformers (DT) 62-N of the present embodiment refer to data transformers (DT) 62 other than the shared data transformers (DT) 62-S from among the data transformers (DT) 62 included in the new pipeline 60-B.

S160 is a step of the data pipeline manager (DPM) 40 creating, connecting, and initializing the non-shared data transformers (DT) 62-N and the data pipes 64 positioned upstream from the shared data transformers (DT) 62-S, in order from whichever precedes the shared data transformer (DT) 62-S that is farthest upstream to whichever is farthest upstream. As described further below, in the present embodiment, DT_a and DT_x, which are non-shared data transformers (DT) 62-N, and the data pipes 64-a and 64-x are created, connected, and initialized in order from downstream. After this, the process moves to S170, and the activation of the new pipeline 60-B is finished.

Figure 3A:
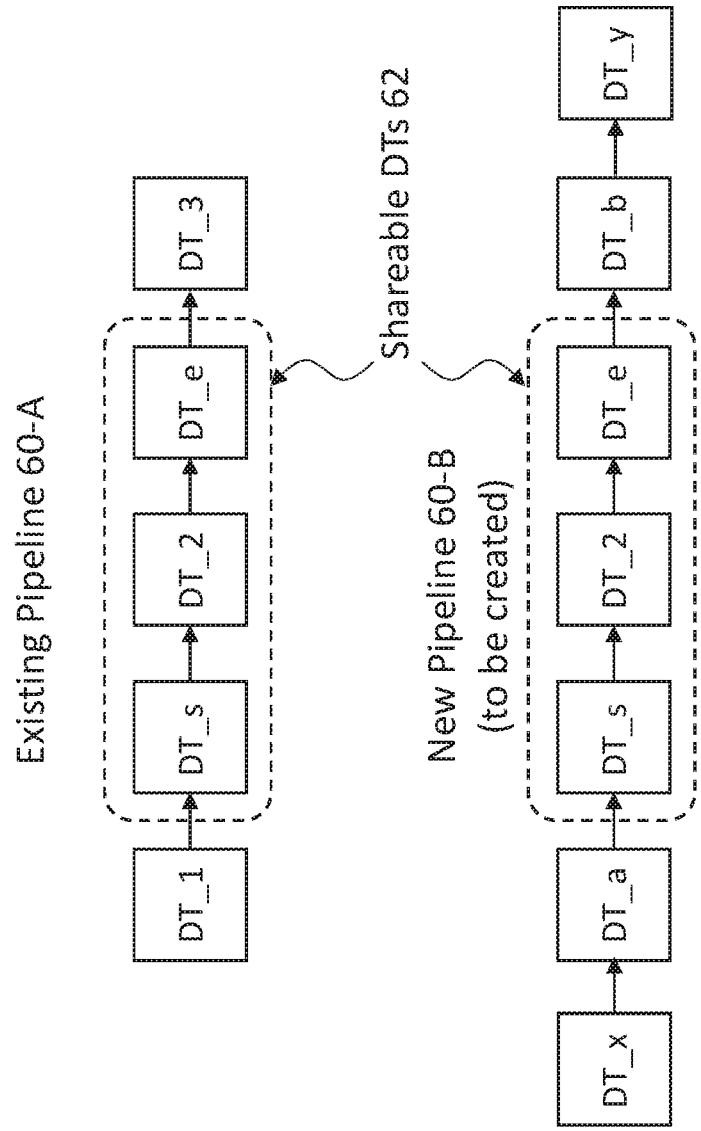
FIG. 3A shows an existing pipeline 60-A and a new pipeline 60-B corresponding to steps S100 to S140, according to an embodiment of the present invention.

FIG. 3A shows an existing pipeline 60-A and a new pipeline 60-B corresponding to steps S100 to S140. The new pipeline 60-B is a pipeline 60 that is not formed at S100, but is newly activated by being created, connected, and initialized through the steps from S100 to S160. The data pipes 64 are indicated by arrows, in order to facilitate understanding.

In the present embodiment, the existing pipeline 60-A is assumed to include a plurality of data transformers (DT) 62 arranged in the order of DT_1, DT_s, DT_2, DT_e, and DT_3, in a direction from upstream to downstream. In S110 of the present embodiment, it is assumed that the new pipeline 60-B included in the notification from the data pipeline manager (DPM) 40 to the resource manager (RM) 70 includes a plurality of data transformers (DT) 62 arranged in the order of DT_x, DT_a, DT_s, DT_2, DT_e, DT_b, and DT_y, in a direction from upstream to downstream.

In the present embodiment, the existing pipeline 60-A includes five data transformers (DT) 62, and the new pipeline 60-B includes seven data transformers (DT) 62. However, the number of data transformers (DT) 62 in the data pipelines 60 is not limited to the above example. The data pipelines 60 may include several, tens of, or hundreds of data transformers (DT) 62.

In S120 of the present embodiment, the result of the resource manager (RM) 70 searching for the shareable data transformers (DT) 62 is assumed to be that shareable data transformers (DT) 62 exist (S130). Therefore, in S140, it is assumed that the resource manager (RM) 70 notifies the data pipeline manager (DPM) 40 that the three data transformers (DT) 62 DT_s, DT_2, and DT_e are shareable data transformers (DT) 62 that fulfill the prescribed conditions.

In the present embodiment, three data transformers (DT) 62 are shareable, but the number of shareable data transformers (DT) 62 is not limited to three, and may be an arbitrary number. In the present embodiment, data transformers (DT) 62 that are actually being shared are described as shared data transformers (DT) 62-S, and data transformers (DT) 62 that are not shared data transformers (DT) 62-S are described as non-shared data transformers (DT) 62-N. In the new pipeline 60-B of the present embodiment, DT_s, DT_2, and DT_e are shared data transformers (DT) 62-S, and DT_x, DT_a, DT_b, and DT_y are non-shared data transformers (DT) 62-N.

Figure 3B:
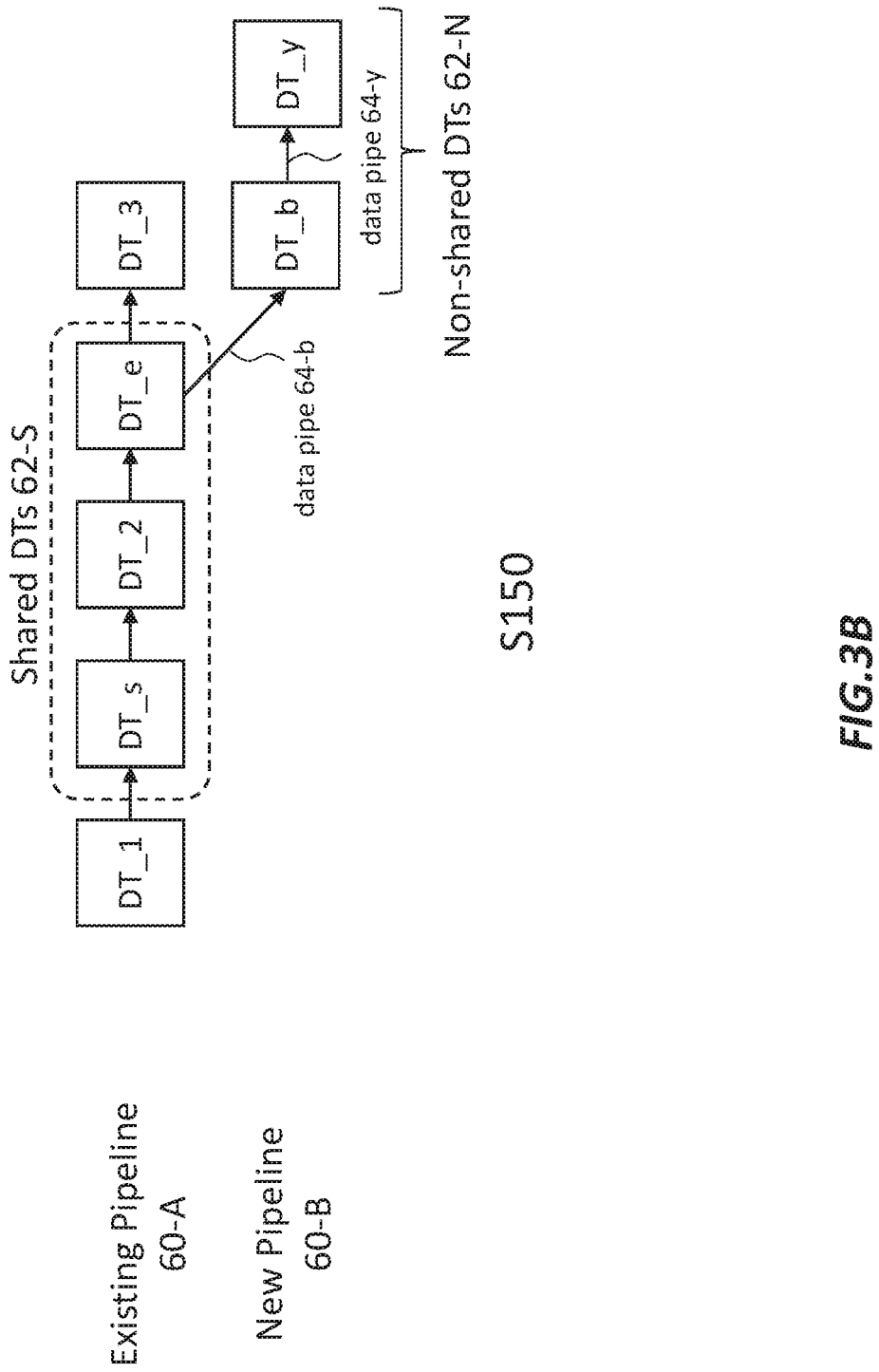
FIG. 3B shows a notifying step corresponding to S150 of FIG. 2, according to an embodiment of the present invention.

FIG. 3B shows S150. In S150, the data pipeline manager (DPM) 40 may create, connect, and initialize the data transformers (DT) 62 and data pipes 64 positioned downstream from the shared data transformers (DT) 62-S, via the data transformer manager (DTM) 50. In the present embodiment, DT_y, the data pipe 64-*y*, DT_b, and the data pipe 64-*b* at positions respectively following from DT_e are newly created, connected, and initialized. In the present embodiment, after DT_b, which is a non-shared data transformer (DT) 62-N, is created, DT_b is connected to DT_e, which is a shared data transformer (DT) 62-S.

As described above, a plurality of implementation means exist for the data pipes 64 that provide connections between the data transformers (DT) 62. For example, the data pipes 64 are implemented by TCP/IP. In a TCP/IP framework in which the client and the server are connected by socket, a data transformer (DT) 62 positioned on an upstream side or a preceding position via a data pipe 64 may be a client that issues a connection request to the server, and a data transformer (DT) 62 positioned on a downstream side or a following position via a data pipe 64 may be a server that receives the connection request from the client. If it is assumed that a corresponding server does not exist, the communication from the client is an error. Therefore, in the present embodiment, the non-shared data transformers (DT) 62-N are created, connected, and initialized in order from the downstream or following side. In contrast to this, if data transformers (DT) 62 are being deleted, deleting the data transformers (DT) 62 in order from the upstream or preceding side is effective for preventing communication errors. If the implementation means of the data pipes 64 is something other than TCP/IP, the order of the creation, connection, initialization, and deletion of the data transformers (DT) 62 may be different from the example corresponding to TCP/IP.

Figure 3C:
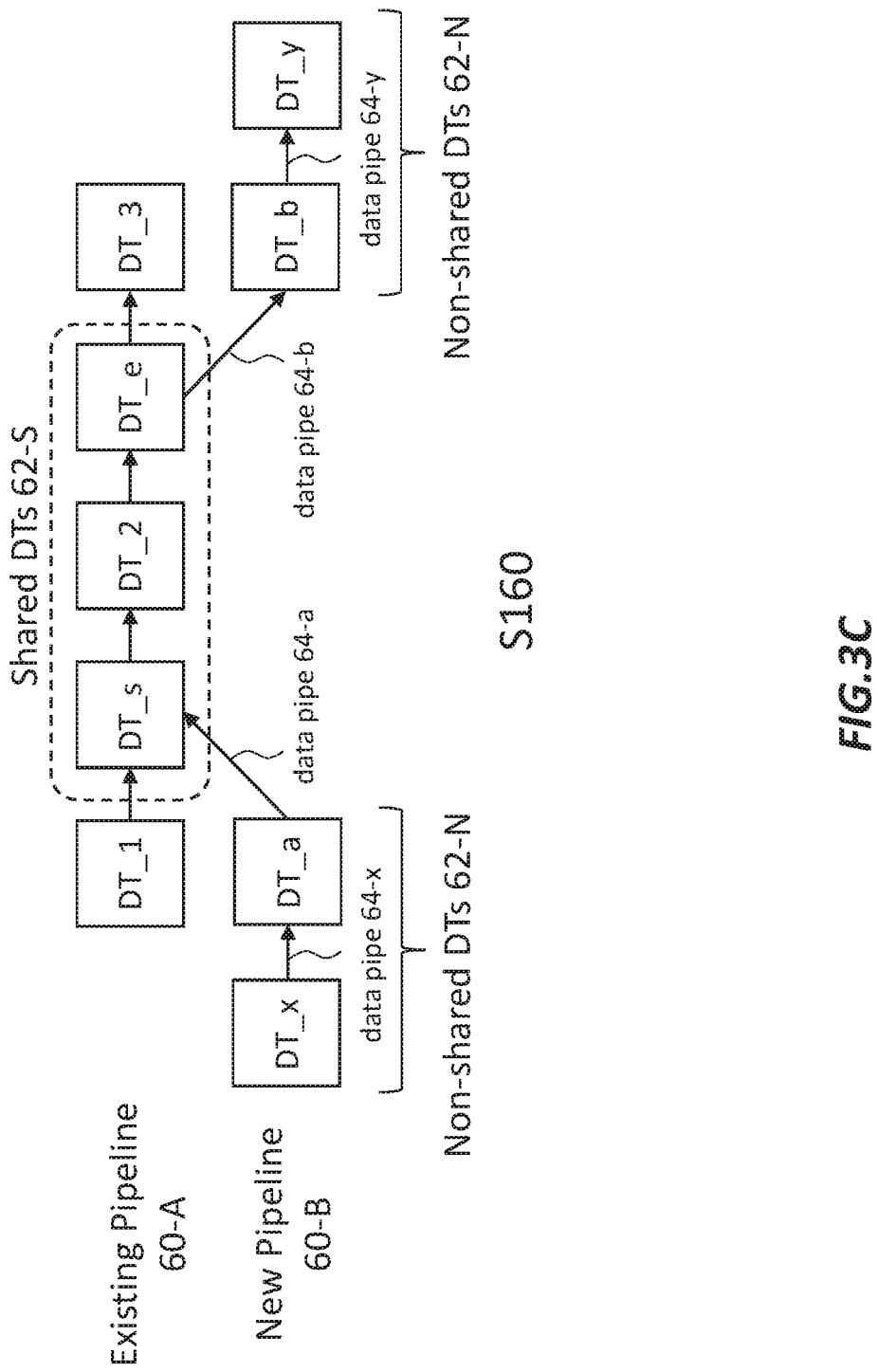
FIG. 3C shows an initializing step corresponding to S160 of FIG. 2, according to an embodiment of the present invention.

FIG. 3C shows S160. In S160, the data pipeline manager (DPM) 40 may create, connect, and initialize the data transformers (DT) 62 and the data pipes 64 positioned upstream from the shared data transformers (DT) 62-S, via the data transformer manager (DTM) 50. In the present embodiment, the data pipe 64-*a*, DT_a, the data pipe 64-*x*, and DT_x, which are at respectively preceding positions from DT_s, are newly created, connected, and initialized. In the present embodiment, after DT_a, which is a non-shared data transformer (DT) 62-N, is created, DT_a is connected to DT_s, which is a shared data transformer (DT) 62-S.

In this way, two partially shared pipelines 60 are completed. In the present embodiment, it is possible to reduce the amount of time needed and resources consumed to activate the new pipeline 60-B, compared to a case in which all of the data transformers (DT) 62 forming the new pipeline 60-B are newly created and connected by data pipes 64. In the present embodiment, since the data pipes 64 are implemented by TCP/IP, the non-shared data transformers (DT) 62-N, i.e. DT_a and DT_x, positioned upstream from the shared data transformers (DT) 62-S may also be created, connected, and initialized in order from downstream. Furthermore, in a case where the data transformers (DT) 62 are deleted as well, the data transformers (DT) 62 may be deleted in order from upstream.

In S130, the resource manager (RM) 70 may set the shared data transformers (DT) 62-S while prioritizing data transformers (DT) 62 other than the data transformers (DT) 62 that are scheduled to be stopped in the existing pipeline 60-A, from among the plurality of data transformers (DT) 62 common to both the existing pipeline 60-A and the new pipeline 60-B. There are cases where data transformers (DT) 62 are repeatedly and periodically stopped and activated. Therefore, the priority of sharing data transformers (DT) 62 that are scheduled to stop may be reduced. In this way, it is possible to prevent in advance the effect of stopped data transformers (DT) 62 on the overall data pipelines 60.

Furthermore, after the shared data transformers (DT) 62-S have been connected to the non-shared data transformers (DT) 62-N, if a processing stop command for stopping the existing pipeline 60-A with which the shared data transformers (DT) 62-S are associated is received, the shared data transformers (DT) 62-S may remain in the activated state. By keeping the shared data transformers (DT) 62-S in the activated state, the new pipeline 60-B can continue the processing even when the existing pipeline 60-A stops. In this way, it is possible to prevent processing errors from occurring in the new pipeline 60-B due to the stopping of one shared data transformer (DT) 62-S.

Yet further, after the shared data transformers (DT) 62-S have been connected to the non-shared data transformers (DT) 62-N, if a processing stop command for stopping the existing pipeline 60-A with which the shared data transformers (DT) 62-S are associated is received, the shared data transformers (DT) 62-S may remain in the activated state until a pipeline 60 that includes the non-shared data transformers (DT) 62-N and is separated from the existing pipeline 60-A is created. For example, the shared data transformers (DT) 62-S associated with the existing pipeline 60-A that received the stop command may stop after the new pipeline 60-B has become separated from the existing pipeline 60-A. In this way, it is possible to quickly recover resources that have been consumed. The separation of a data pipeline 60 is described in FIG. 5 and FIG. 6A to FIG. 6I.

Figure 4:
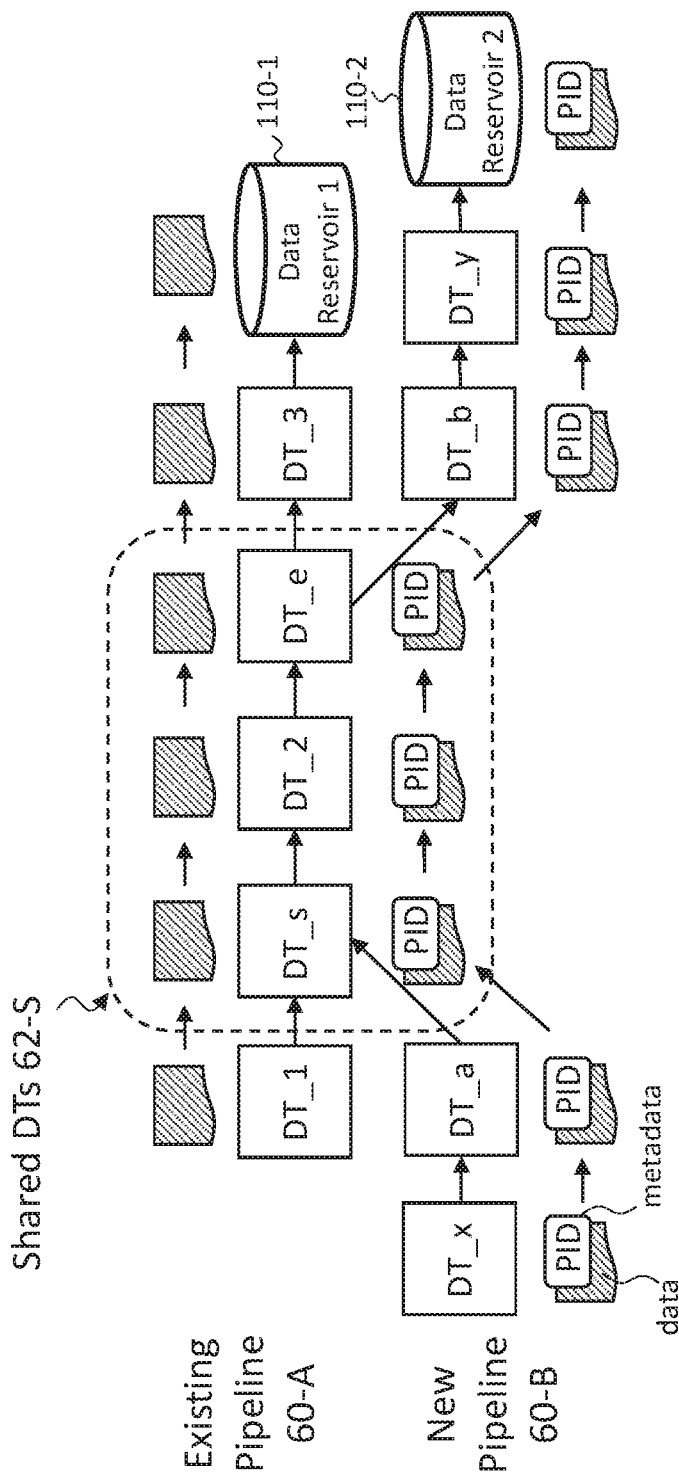
FIG. 4 shows the flow of data in a case where shared data transformers (DT) 62-S exist, according to an embodiment of the present invention.

FIG. 4 shows the flow of data in a case where shared data transformers (DT) 62-S exist. In the present embodiment, the PID indicating the new pipeline 60-B exists in the metadata. The metadata may be attached to the data. When the PID is detected during data processing by DT_e, the data pipeline manager (DPM) 40 may instruct DT_e in advance to output the data after processing to DT_b and not DT_3. In this way, the data to be processed in the existing pipeline 60-A is output from DT_e to DT_3. On the other hand, the data to be processed in the new pipeline 60-B is output from DT_e to DT_b. In the present embodiment, in this way, it is possible for the existing pipeline 60-A and the new pipeline 60-B to perform respectively different processes, before and after the common processing in the shared data transformers (DT) 62-S.

In the first embodiment, an example is described in which three data transformers (DT) 62 are shared. However, the number of shared data transformers (DT) 62-S is not limited to three. The number of shared data transformers (DT) 62-S may be one, two, or four or more. Furthermore, the shared data transformers (DT) 62-S are provided continuously in the data pipelines 60, but some or all of the shared data transformers (DT) 62-S may be provided non-continuously.

Figure 5:
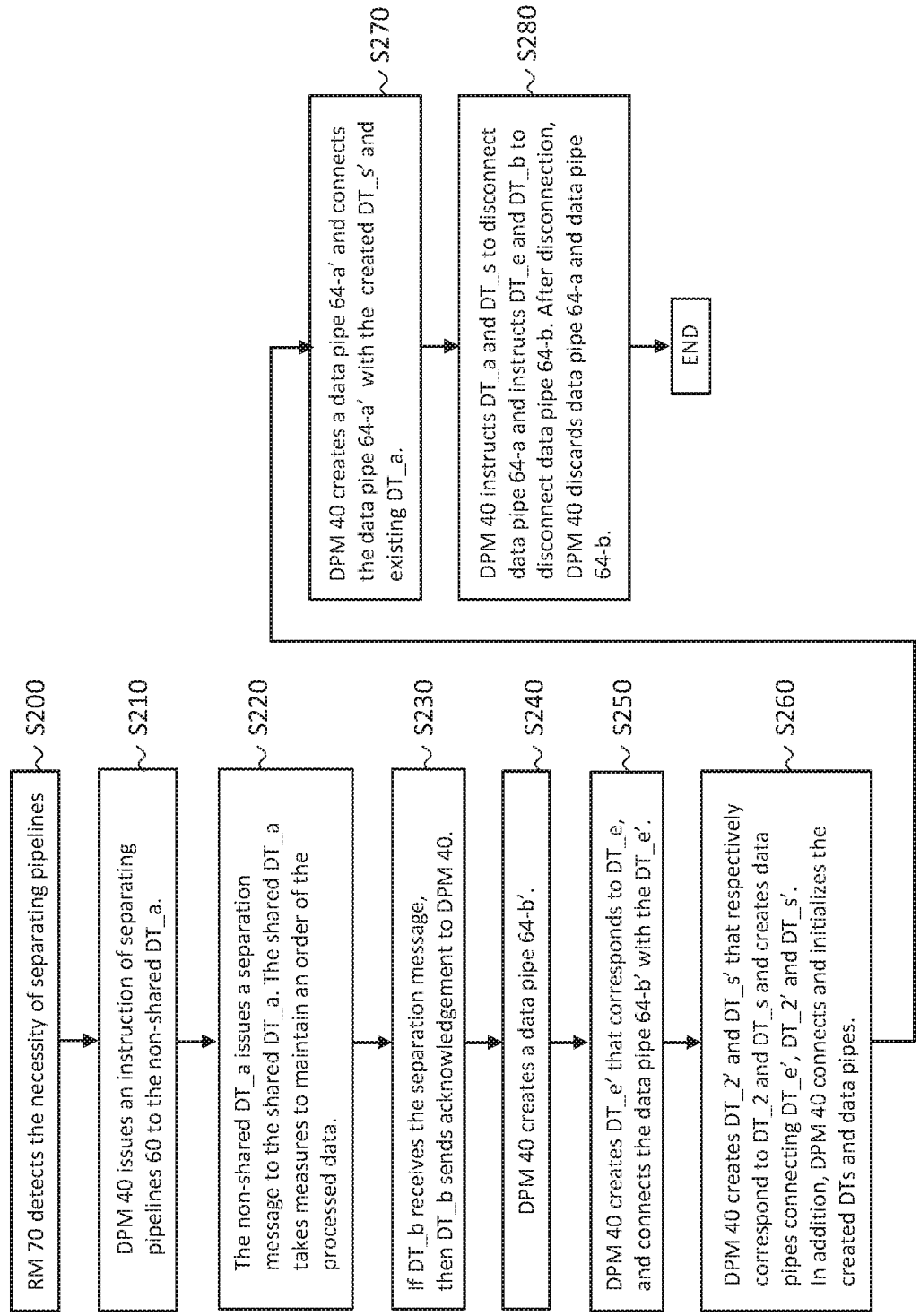
FIG. 5 shows an operational flow for separating the data pipelines 60, according to another embodiment.

FIG. 5 shows an operational flow for separating the data pipelines 60, according to a second embodiment. This operational flow is one example of an operating method of the system 100. In the second embodiment, the two partially shared pipelines 60 in the first embodiment may be separated into separate data pipelines 60. In other words, in the second embodiment, after the non-shared data transformers (DT) 62-N and the shared data transformers (DT) 62-S are connected, a data pipeline 60 (corresponding to the new pipeline 60-B in the first embodiment) that is separate from the existing pipeline 60-A may be formed.

S200 is a step of starting the separation of the data pipelines 60. The resource manager (RM) 70 may start this step by detecting the necessity of separation of the data pipelines 60. The resource manager (RM) 70 may notify the data pipeline manager (DPM) 40 about the necessity of separation of the data pipelines 60. The necessity of separation of the data pipelines 60 may be, for example, the fact that the processing speed of one or more of the shared data transformers (DT) 62-S has dropped. Furthermore, the necessity of separation of the data pipelines 60 may be designated in instructions from a manager (person).

S210 is a step of the data pipeline manager (DPM) 40 issuing instructions for separation to the non-shared data transformer (DT) 62-N at the next upstream position from the shared data transformer (DT) 62-S that is farthest upstream, which is a data transformer (DT) 62 associated with the data pipeline 60 that is scheduled to be separated from the existing pipeline 60-A. In the second embodiment, DT_a is the non-shared data transformer (DT) 62-N at the next upstream position from the shared data transformer (DT) 62-S positioned farthest upstream, and therefore the data pipeline manager (DPM) 40 issues the instructions for separation of the two partially shared pipelines 60 to DT_a.

S220 is a step of the data transformer (DT) 62 at the next upstream position from the shared data transformer (DT) 62-S positioned farthest upstream, which is a data transformer (DT) 62 associated with the data pipeline 60 that is scheduled to be separated from the existing pipeline 60-A, outputting a separation message indicating separation from the existing pipeline 60-A. In the second embodiment, DT_a may input the separation message to the shared data transformers (DT) 62-S. The separation message may be specialized data meaning that the new pipeline 60-B is to be separated from the existing pipeline 60-A.

In the second embodiment, DT_a pauses the output of the processed data to the data transformer (DT) 62 at the next stage until the separate data pipeline 60 is created. DT_a may maintain this paused state until the data pipeline 60 corresponding to the new pipeline 60-B is separated from the existing pipeline 60. In this way, it is possible to prevent disturbances in the order among the processed data, i.e. overtaking in the data order, and therefore it is possible to maintain the order of the processed data. In another example, instead of pausing the output, DT_a may use a means other than pausing to maintain the order of the processed data.

S230 is a step of the data transformer (DT) 62 at the next downstream position from the shared data transformer (DT) 62-S positioned farthest downstream, which is a data transformer (DT) 62 associated with the data pipeline 60 that is scheduled to be separated from the existing pipeline 60-A, notifying the data pipeline manager (DPM) 40 that the separation message has been received. In the second embodiment, DT_b notifies the data pipeline manager (DPM) 40 that the separation message has been received on a condition that DT_b, which is at a position following the DT_e that is the shared data transformer (DT) 62-S positioned farthest downstream, has received the separation message.

S240 is a step the data pipeline manager (DPM) 40 creating the data pipe 64 for connecting the to the data transformer (DT) 62 at the next downstream position from the shared data transformer (DT) 62-S positioned farthest downstream in the data pipeline 60 that is to be separated. In the second embodiment, after DT_b receives the separation message, the data pipeline manager (DPM) 40 creates, connects, and initializes the data pipe 64-*b'*.

S250 is a step of the data pipeline manager (DPM) 40 creating the data transformer (DT) 62 corresponding to the shared data transformer (DT) 62-S positioned farthest downstream, and connecting to the data pipe 64-*b'*. In the second embodiment, the data pipeline manager (DPM) 40 creates DT_e' corresponding to DT_e, and connects DT_e' and the data pipe 64-*b'*. Furthermore, the data pipeline manager (DPM) 40 may initialize DT_e'.

S260 is a step of the data pipeline manager (DPM) 40 creating, connecting, and initializing the data transformers (DT) 62 corresponding to the other shared data transformers (DT) 62-S and the data pipes 64 connecting these data transformers (DT) 62. In the second embodiment, the data pipeline manager (DPM) 40 may create DT_2' and DT_s' corresponding to DT_2 and DT_s, connect DT_e', DT_2', and DT_s' with the data pipes 64, and initialize the created data transformers (DT) 62 and data pipes 64 in order from downstream.

S270 is a step of the data pipeline manager (DPM) 40 creating the data pipe 64 for connecting to the data transformer (DT) 62 at the next upstream position from the shared data transformer (DT) 62-S positioned farthest upstream in the data pipeline 60 to be separated. In the second embodiment, the data pipeline manager (DPM) 40 creates the data pipe 64-*a'* for connecting to DT_s' corresponding to DT_s, and connects DT_s' and DT_a with the data pipe 64-*a'*. Furthermore, the data pipeline manager (DPM) 40 may initialize the data pipe 64-*a'*.

S280 is a step of the data pipeline manager (DPM) 40 eliminating the connection between the shared data transformer (DT) 62-S and the data pipeline 60 that is to be separated. In the second embodiment, the data pipeline manager (DPM) 40 eliminates the connections of the data pipe 64-*a* to DT_s and DT_a, and eliminates the connections of the data pipe 64-*b* to DT_e and DT_b. After this, the data pipeline manager (DPM) 40 may discard the data pipes 64-*a* and 64-*b*.

After this, the data pipeline manager (DPM) 40 may provide notification that the separation is complete to the shared data transformers (DT) 62-S positioned farthest upstream and farthest downstream in the data pipeline 60-1, to the data transformer (DT) 62 that is one before the shared data transformer (DT) 62-S positioned farthest upstream in the data pipeline 60-2, and to the data transformer (DT) 62 that is one after the shared data transformer (DT) 62-S positioned farthest downstream in the data pipeline 60-2. In the second embodiment, the data pipeline manager (DPM) 40 provides notification that separation is complete to DT_s and DT_e of the data pipeline 60-1 and to DT_a and DT_b of the data pipeline 60-2. After the notification of the separation completion is received, DT_a may resume the output of data that had been paused.

Figure 6A:
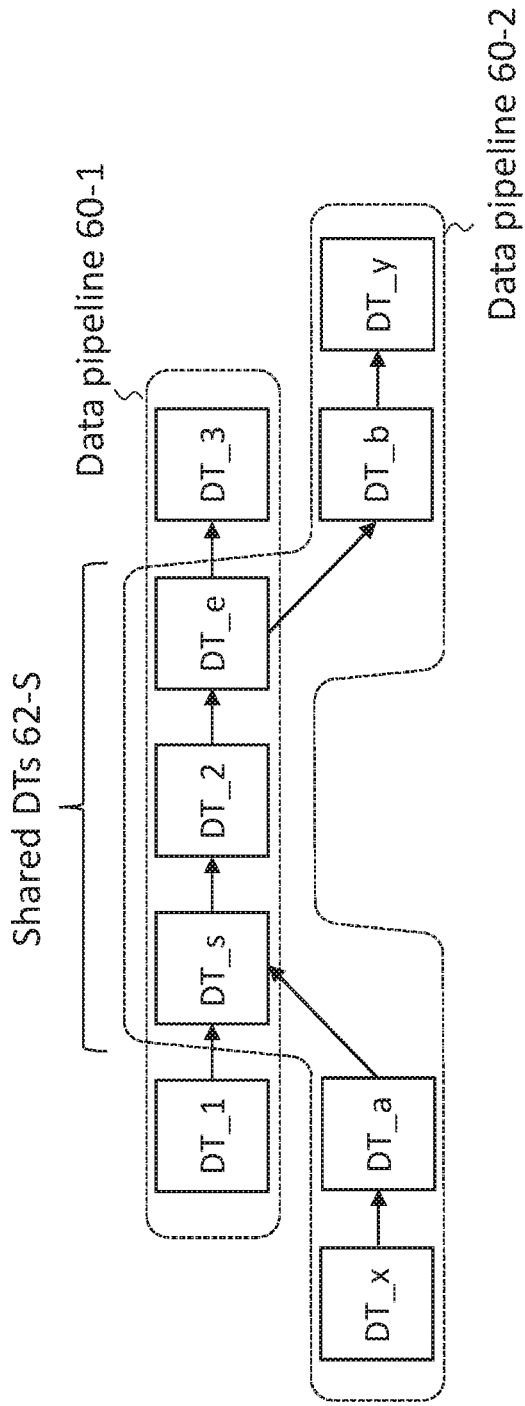
FIG. 6A shows the two partially shared data pipelines 60 in S200, according to an embodiment of the present invention.

FIG. 6A shows the two partially shared data pipelines 60 in S200. In S200, DT_s, DT_2, and DT_a (the three shared data transformers (DT) 62-S) may be shared by the two data pipelines 60-1 and 60-2. From this state, the separation of the data pipelines 60 may be started. FIG. 6B shows S210. In S210, the data pipeline manager (DPM) 40 may issue instructions to DT_a for separation of the two partially shared pipelines 60.

Figure 6C:
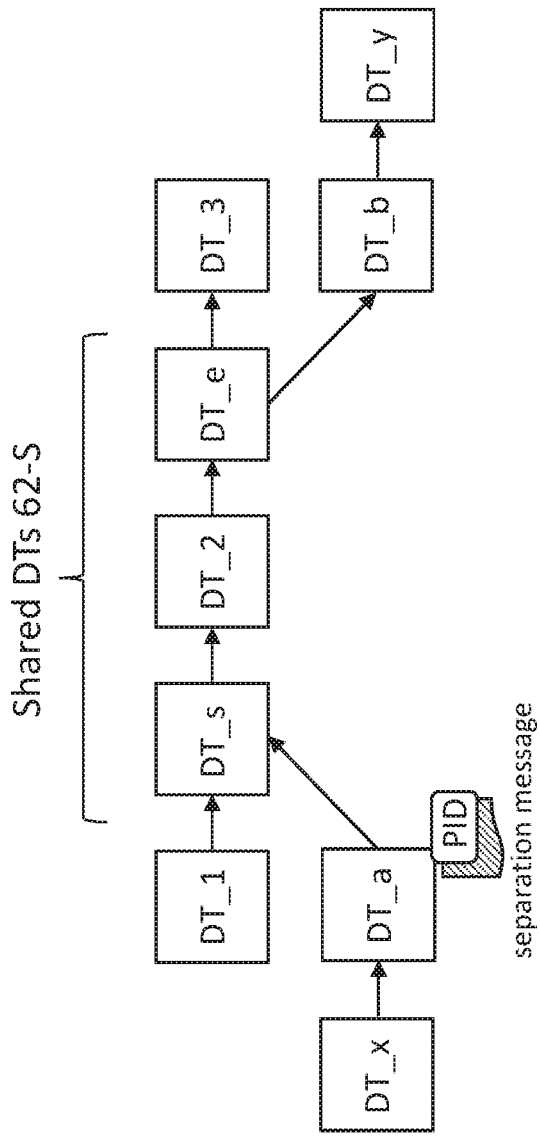
FIG. 6C shows a message separation step corresponding to S220 of FIG. 5, according to an embodiment of the present invention.

FIG. 6C shows S220. In S220, DT_a may input a separation message to the shared data transformers (DT) 62-S. FIG. 6D shows S230. In S230, on the condition that DT_b has received the separation message, DT_b may notify the data pipeline manager (DPM) 40 that the separation message has been received.

Figure 6E:
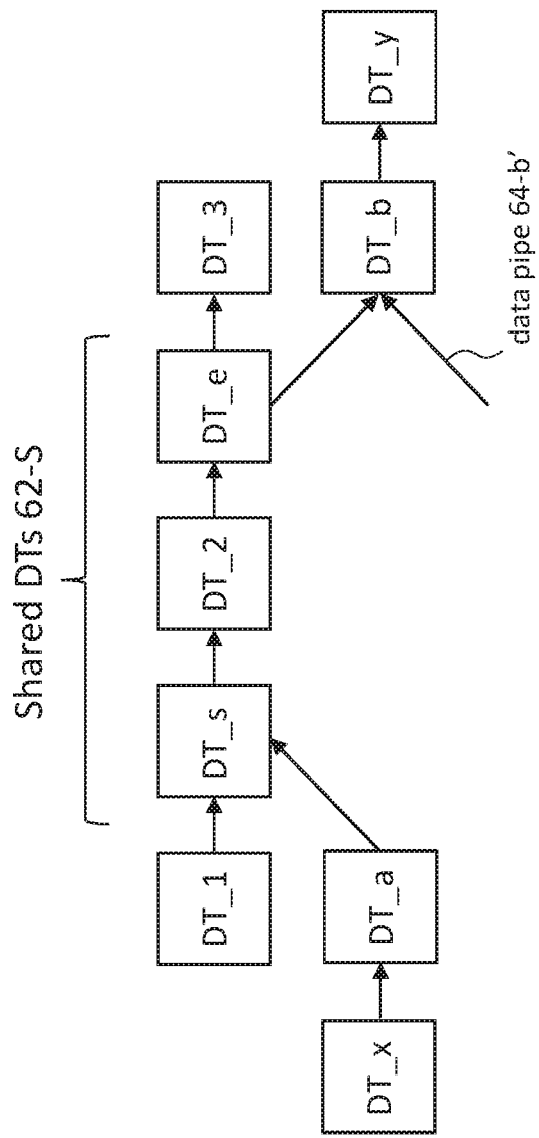
FIG. 6E shows a pipeline creation step corresponding to S240 of FIG. 5, according to an embodiment of the present invention.

FIG. 6E shows S240. In S240, the data pipeline manager (DPM) 40 may create the data pipe 64-*b*' connecting to DT_b, after DT_b has received the separation message. FIG. 6F shows S250. In S250, the data pipeline manager (DPM) 40 may create DT_e' corresponding to DT_e, and connect DT_e' and the data pipe 64-*b*'.

Figure 6G:
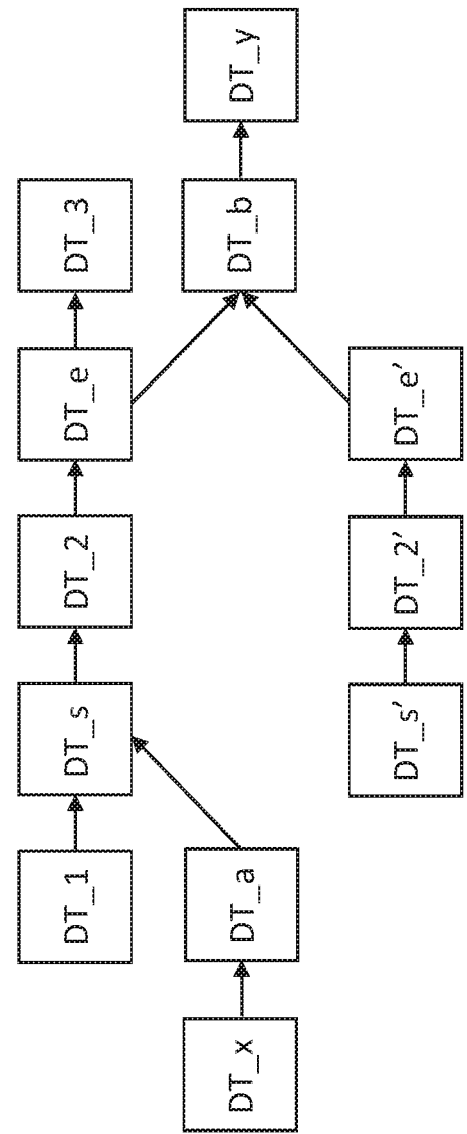
FIG. 6G shows a data transformer connecting step corresponding to S260 of FIG. 5, according to an embodiment of the present invention.

FIG. 6G shows S260. In S260, the data pipeline manager (DPM) 40 may create DT_2' and DT_s', and connect these with the data pipe 64. FIG. 6H shows S270. In S270, the data pipeline manager (DPM) 40 may create the data pipe 64-*a*' and connect DT_s' and DT_a with the data pipe 64-*a*'.

Figure 6I:
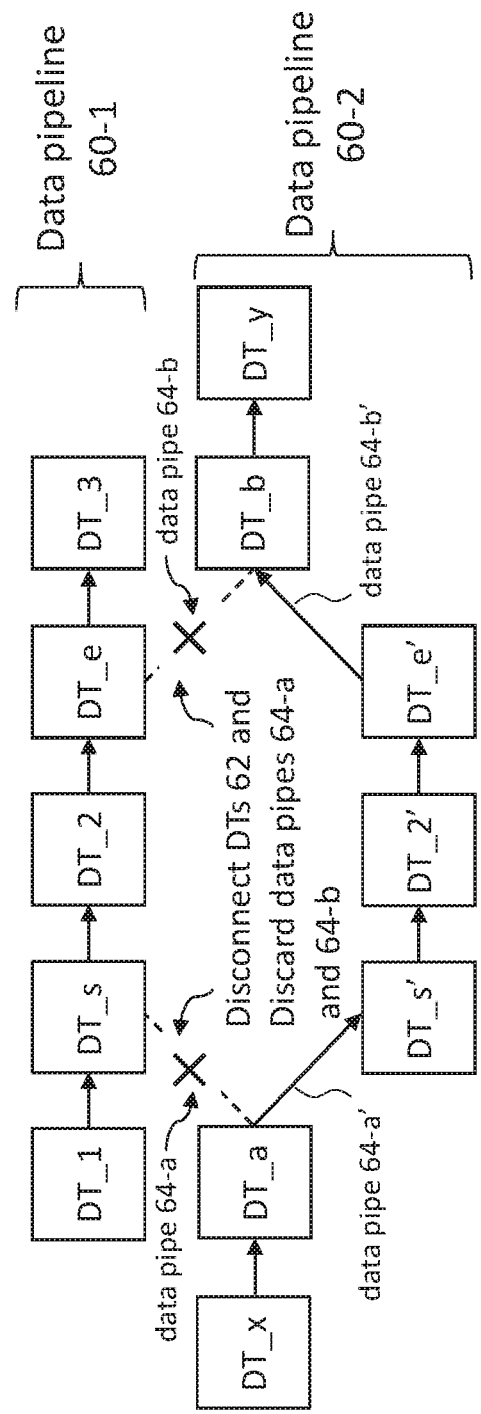
FIG. 6I shows a disconnect instruction step corresponding to S280 of FIG. 5, according to an embodiment of the present invention.

FIG. 6I shows S280. In S280, the data pipeline manager (DPM) 40 may eliminate the connections of the data pipes 64-*a* and 64-*b*, and then discard the data pipes 64-*a* and 64-*b*. If there is a user A who provides memory resources for DT_s, DT_2, and DT_e and a user B and a user C who are allowed to temporarily use the shared data transformers (DT) 62-S, the user A may continue using their own memory resources. In contrast to this, the users B and C may both activate DT_s', DT_2', and DT_e' with the memory resources of the same other person, or may activate DT_s', DT_2', and DT_e' with the memory resources of different other people.

Figure 7:
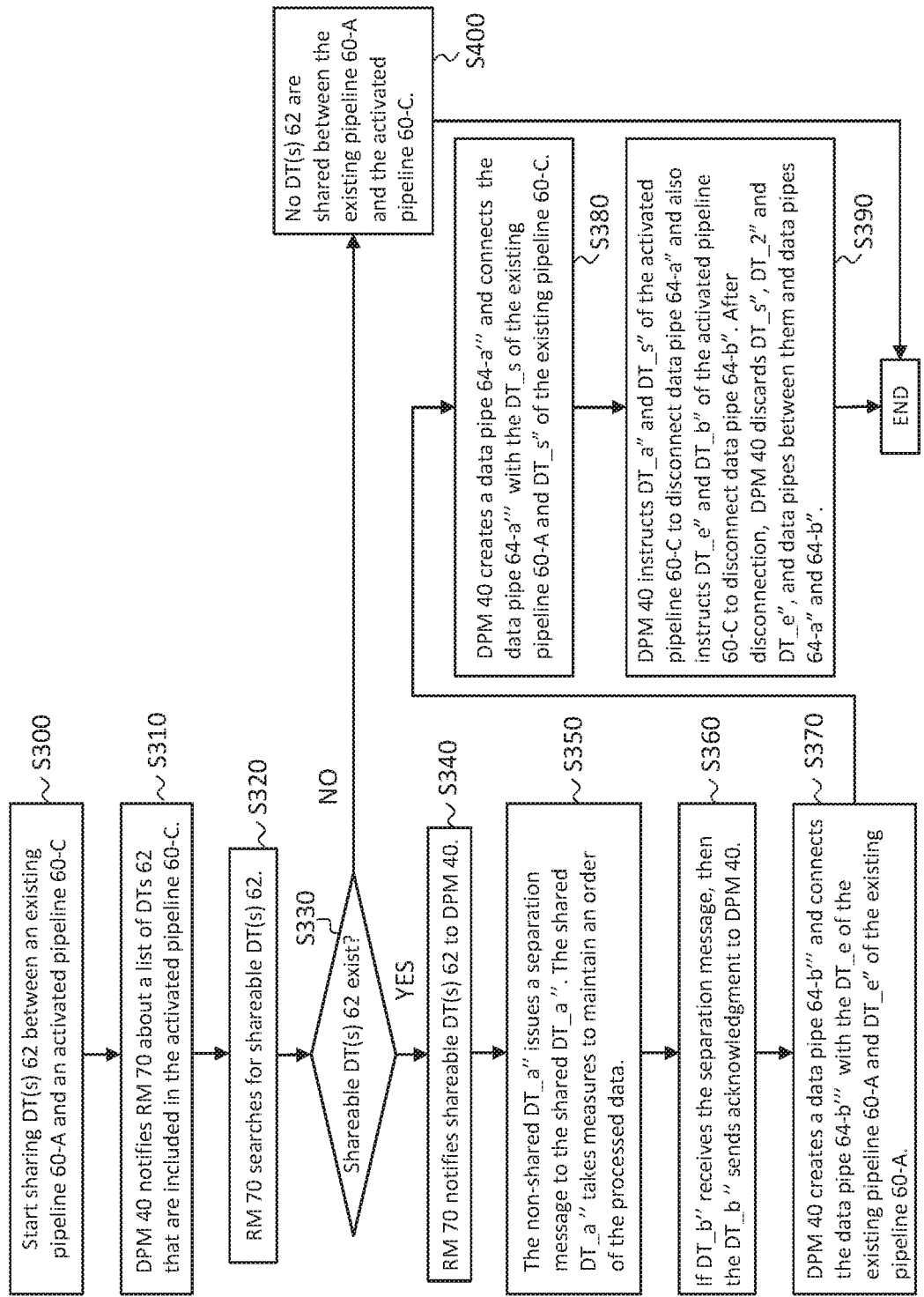
FIG. 7 shows an operational flow for sharing data transformers (DT) 62 according to another embodiment.

FIG. 7 shows an operational flow for sharing data transformers (DT) 62 according to a third embodiment. The existing pipeline 60-A is assumed to be similar to the existing pipeline 60-A in the first embodiment. The activated pipeline 60-C is assumed to include a plurality of data transformers (DT) 62 arranged in the order of DT_x", DT_a", DT_s", DT_2", DT_e", DT_b", and DT_y", in the direction from upstream to downstream.

S300 is a step of starting the sharing of data transformers (DT) 62 between already existing data pipelines 60. S310 is a step of the data pipeline manager (DPM) 40 notifying the resource manager (RM) 70 about the list of data transformers (DT) 62 included in the activated pipeline 60-C.

S320 is a step of the resource manager (RM) 70 searching for shareable data transformers (DT) 62. In the present embodiment, the resource manager (RM) 70 searches for shared data transformers (DT) 62-S that are shareable with the existing pipeline 60-A, among the data transformers (DT) 62 included in the activated pipeline 60-C that is already activated. The non-shared data transformers (DT) 62-N of the present embodiment refer to the data transformers (DT) 62 other than the shared data transformers (DT) 62-S, among the data transformers (DT) 62 included in the activated pipeline 60-C.

S330 is a step of branching according to certain conditions. If the resource manager (RM) 70 does not detect any shareable data transformers (DT) 62 (NO at S330), the process moves to S400. At S400, the sharing of data transformers (DT) 62 is not performed.

On the other hand, if the resource manager (RM) 70 detects shareable data transformers (DT) 62 that fulfill the prescribed conditions (YES at S330), the process moves to S340. S340 is a step of the resource manager (RM) 70 notifying the data pipeline manager (DPM) 40 about the determined shared data transformers (DT) 62-S.

S350 is a step of outputting the separation message for separating the data transformer (DT) 62 at the next position upstream from the shared data transformer (DT) 62-S positioned farthest upstream, from the activated pipeline 60-C. In the third embodiment, DT_a" may input the separation message to the shared data transformer (DT) 62-S. In the same manner as in the second embodiment, the separation message may be specialized data indicating separation of the shared data transformers (DT) 62-S in the activated pipeline 60-C and other data transformers (DT) 62-S in the activated pipeline 60-C.

S360 is a step of the data transformer (DT) 62 at the next downstream position from the shared data transformer (DT) 62-S positioned farthest downstream, which is a data transformer (DT) 62 associated with the activated pipeline 60-C, notifying the data pipeline manager (DPM) 40 that the separation message has been received. In the third embodiment, on a condition that DT_b" has received the separation message, DT_b" notifies the data pipeline manager (DPM) 40 that the separation message has been received.

S370 is a step of the data pipeline manager (DPM) 40 creating the data pipe 64 for connecting to the data transformer (DT) 62 at the next downstream position from the shared data transformer (DT) 62-S positioned farthest downstream in the activated pipeline 60-C. In the third embodiment, after DT_b" has received the separation message, the data pipeline manager (DPM) 40 creates and initializes the data pipe 64-*b*" for connecting to DT_b" and connects DT_e and DT_b" with the data pipe 64-*b*".

S380 is a step of the data pipeline manager (DPM) 40 creating the data pipe 64 for connecting to the data transformer (DT) 62 at the next upstream position from the shared data transformer (DT) 62-S positioned farthest upstream in the activated pipeline 60-C. In the third embodiment, the data pipeline manager (DPM) 40 creates and initializes the data pipe 64-*a*'" for connecting DT_s and DT_a" and connects DT_s and DT_a" with the data pipe 64-*a*'". In this way, the data pipeline manager (DPM) 40 may connect the non-shared data transformers (DT) 62-N among the data transformers (DT) 62 included in the activated pipeline 60-C and the shared data transformers (DT) 62-S in the existing pipeline 60-A.

S390 is a step of the data pipeline manager (DPM) 40 eliminating the connection between the shared data transformers (DT) 62-S in the activated pipeline 60-C and the non-shared data transformers (DT) 62-N of the activated pipeline 60-C. In the third embodiment, the data pipeline manager (DPM) 40 eliminates the connection between DT_a" and DT_s" provided by the data pipe 64-a" and eliminates the connection between DT_e" and DT_b" provided by the data pipe 64-b". After this, the data pipeline manager (DPM) 40 may discard the data transformers (DT) 62 corresponding to the shared data transformers (DT) 62-S in the activated pipeline 60-C and the data pipes 64 connecting these data transformers (DT) 62.

Figure 8A:
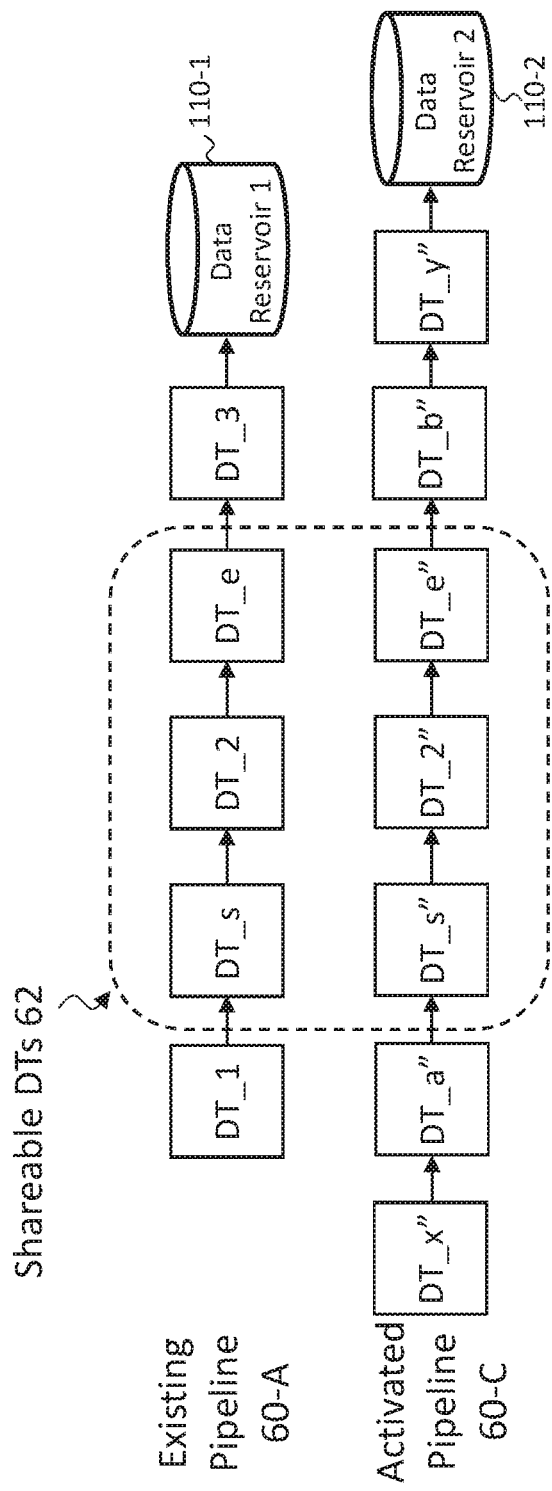
FIG. 8A shows the existing pipeline 60-A and the activated pipeline 60-C in steps S300 to S340, according to an embodiment of the present invention.

FIG. 8A shows the existing pipeline 60-A and the activated pipeline 60-C in steps S300 to S340. The resource manager (RM) 70 may search for shared data transformers (DT) 62-S that are shared with the existing pipeline 60-A from the activated pipeline 60-C(S320). In the present embodiment, DT_s, DT_2, and DT_e of the existing pipeline 60-A are assumed to be shareable with DT_s", DT_2", and DT_e" of the activated pipeline 60-C (i.e. YES at S330). Therefore, the resource manager (RM) 70 may notify the data pipeline manager (DPM) 40 about DT_s, DT_2, and DT_e.

Figure 8B:
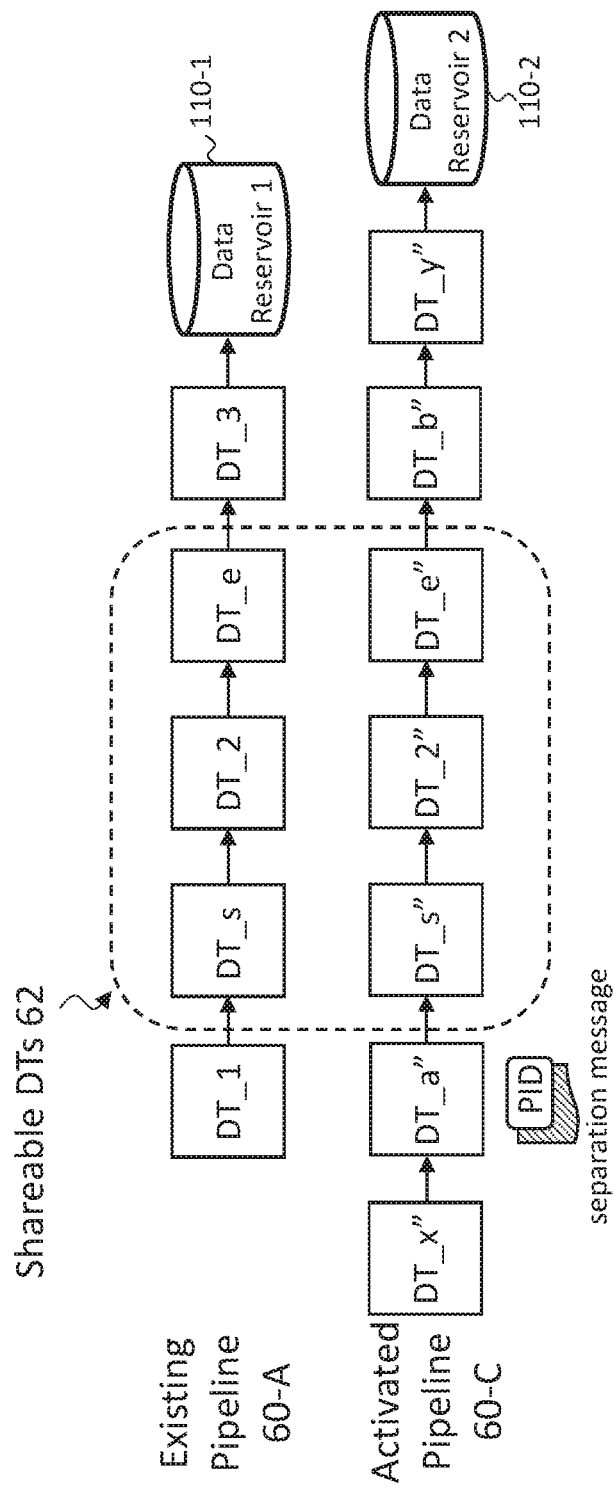
FIG. 8B shows a separation message step corresponding to S350 of FIG. 7, according to an embodiment of the present invention.
Figure 8C:
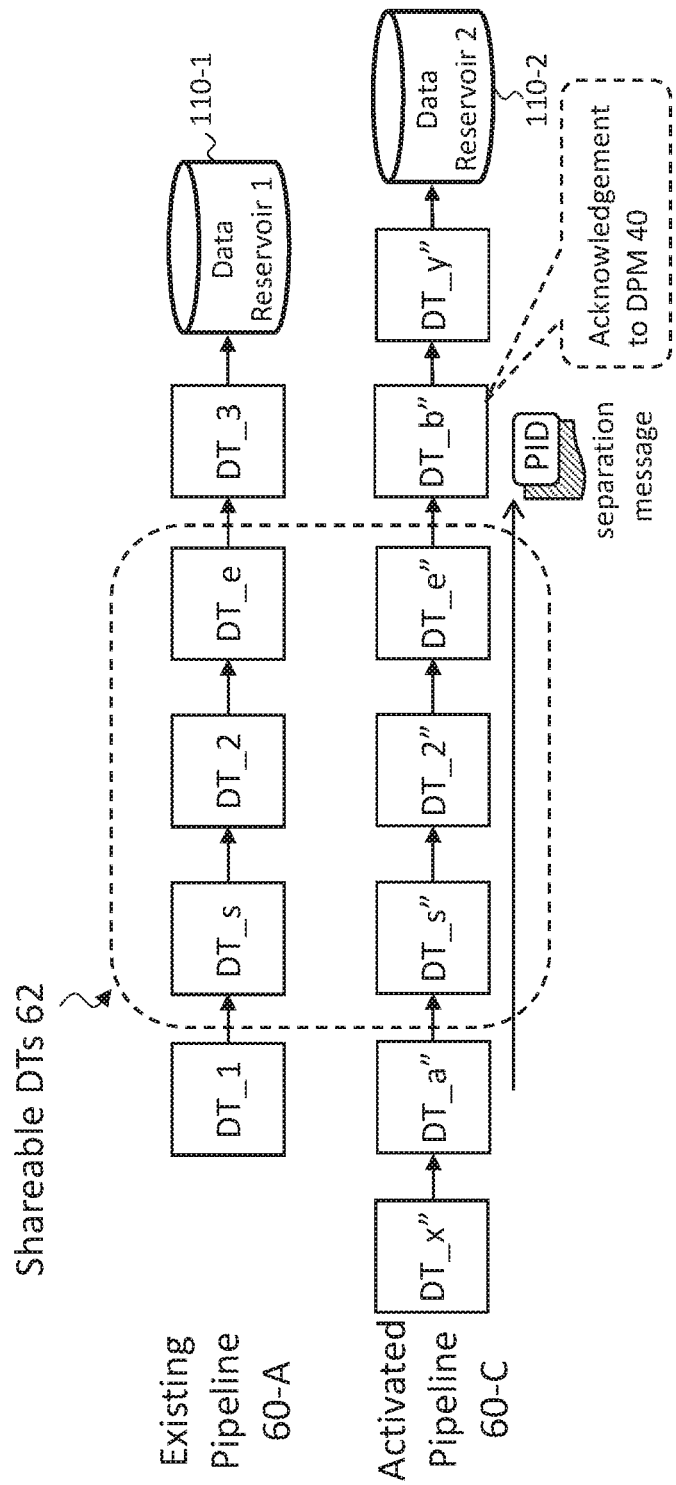
FIG. 8C shows an acknowledgement step corresponding to S360 of FIG. 7, according to an embodiment of the present invention.

FIG. 8B shows S350. In S350, DT_a" may input the separation message to the shared data transformers (DT) 62-S. FIG. 8C shows S360. In S360, on a condition that DT_b" has received the separation message, DT_b" may notify the data pipeline manager (DPM) 40 that the separation message has been received.

Figure 8D:
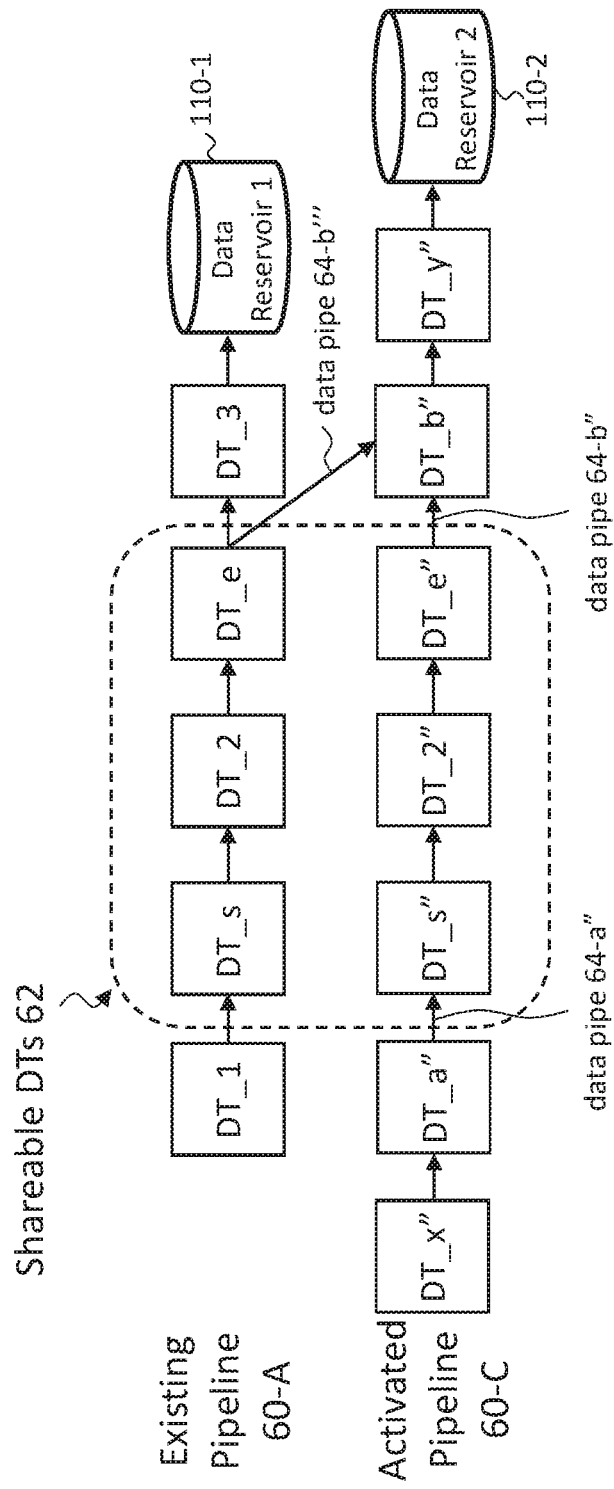
FIG. 8D shows a data pipeline creation step corresponding to S370 of FIG. 7, according to an embodiment of the present invention.
Figure 8E:
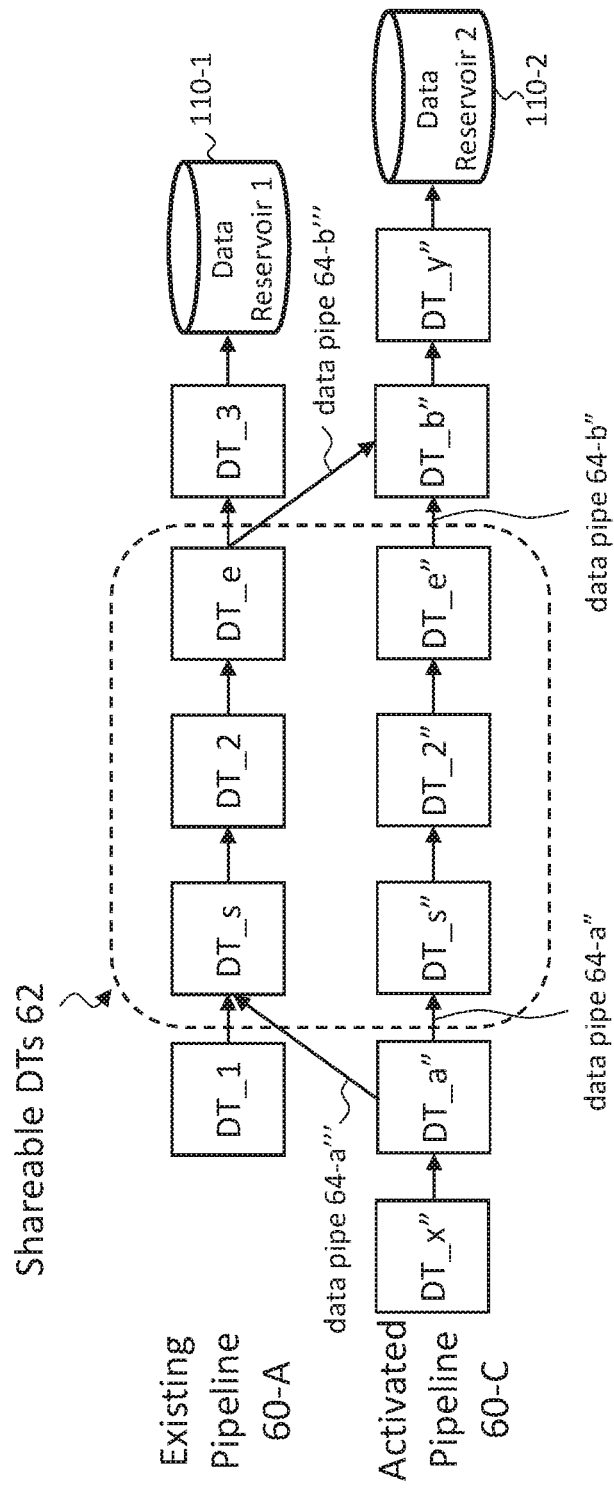
FIG. 8E shows a data pipeline connection step corresponding to S380 of FIG. 7, according to an embodiment of the present invention.

FIG. 8D shows S370. In S370, after DT_b" has received the separation message, the data pipeline manager (DPM) 40 may create and initialize the data pipe 64-b" and connect DT_e and DT_b" with the data pipe 64-b'". FIG. 8E shows S380. In S380, the data pipeline manager (DPM) 40 may create and initialize the data pipe 64-a'" and connect DT_s and DT_a" with the data pipe 64-a'".

Figure 8F:
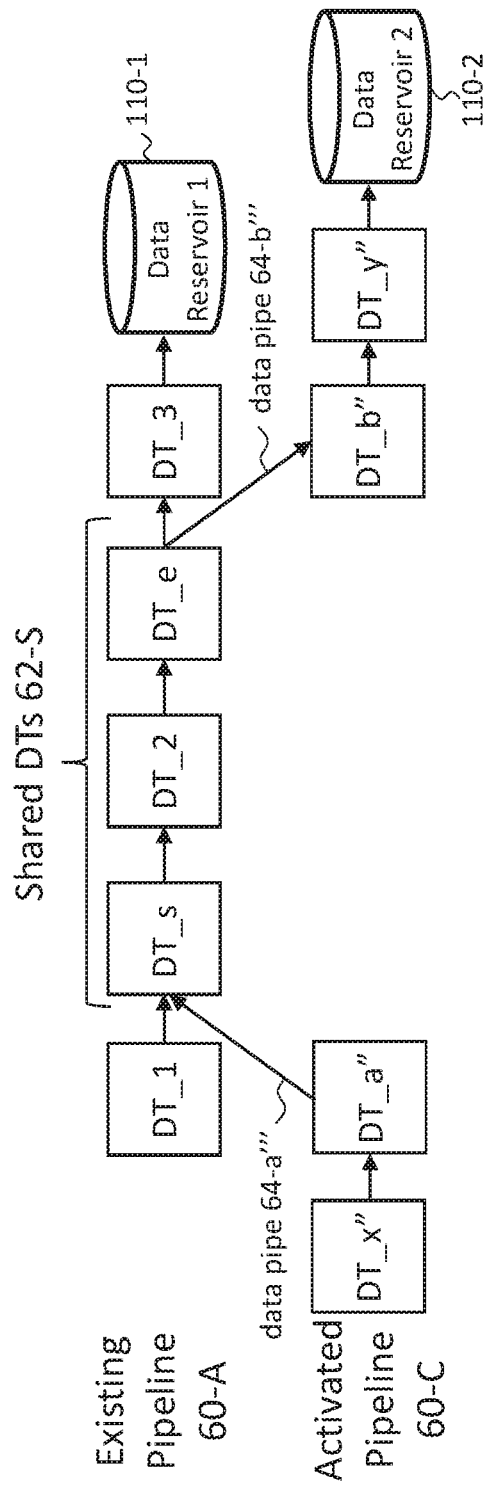
FIG. 8F shows a disconnect instruction step corresponding to S390 of FIG. 7, according to an embodiment of the present invention.

FIG. 8F shows S390. In S390, the data pipeline manager (DPM) 40 may eliminate the connections provided by the data pipes 64-a" and 64-b", and may then discard DT_s", DT_2", and DT_e" in the activated pipeline 60-C and the data pipes 64 connecting these data transformers.

In the third embodiment, in the same manner as in the first embodiment, the data transformers (DT) 62 judged to be shareable between the existing pipeline 60-A and the activated pipeline 60-C according to the prescribed conditions may be shared. As an example, the shared data transformers (DT) 62-S may be set while prioritizing data transformers (DT) 62 other than data transformers (DT) 62 that are scheduled to be stopped in the existing pipeline 60-A, among the plurality of data transformers (DT) 62 that are common to the existing pipeline 60-A and the activated pipeline 60-C. It is obvious that the prescribed conditions described in the first embodiment may be applied.

Figure 9A:
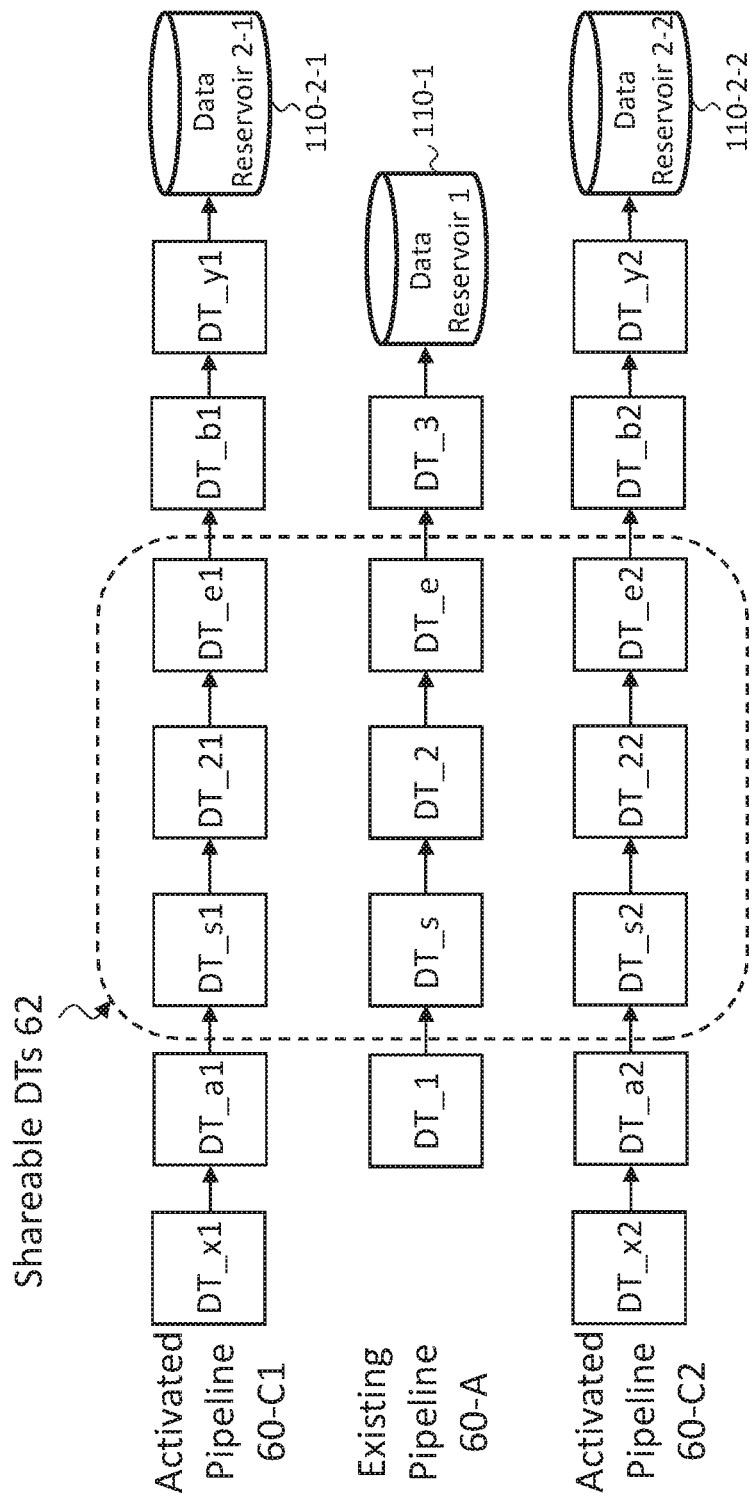
FIG. 9A shows sharing of data transformers (DT) 62 according to another embodiment.

FIG. 9A shows sharing of data transformers (DT) 62 according to a fourth embodiment. In the fourth embodiment, the system 100 includes the existing pipeline 60-A along with a first activated pipeline 60-C1 and a second activated pipeline 60-C2. The resource manager (RM) 70 may search for a plurality of shared data transformers (DT) 62-S that are shared with the existing pipeline 60-A in the first activated pipeline 60-C1 and the second activated pipeline 60-C2.

If at least some of the candidate data transformers (DT) 62 that can possibly become shared data transformers (DT) 62-S are included in both the first activated pipeline 60-C1 and the second activated pipeline 60-C2, the resource manager (RM) 70 may select all of the shared data transformers (DT) 62-S from either one of the first activated pipeline 60-C1 and the second activated pipeline 60-C2. In this way, it is possible to reduce the amount of resources consumed by the system. Furthermore, it is possible to reduce the work of changing the connections of the data pipes 64, compared to a case where the shared data transformers (DT) 62-S are selected from both the first activated pipeline 60-C1 and the second activated pipeline 60-C2.

In the present embodiment, the shareable data transformers (DT) 62 are DT_s, DT_2, and DT_e in the existing pipeline 60-A, DT_S1, DT_21, and DT_e1 in the first activated pipeline 60-C1, and DT_S2, DT_22, and DT_e2 in the second activated pipeline 60-C2. In the present embodiment, the resource manager (RM) 70 may select all of the shared data transformers (DT) 62-S from the first activated pipeline 60-C1, or may select all of the shared data transformers (DT) 62-S from the second activated pipeline 60-C2.

Figure 9B:
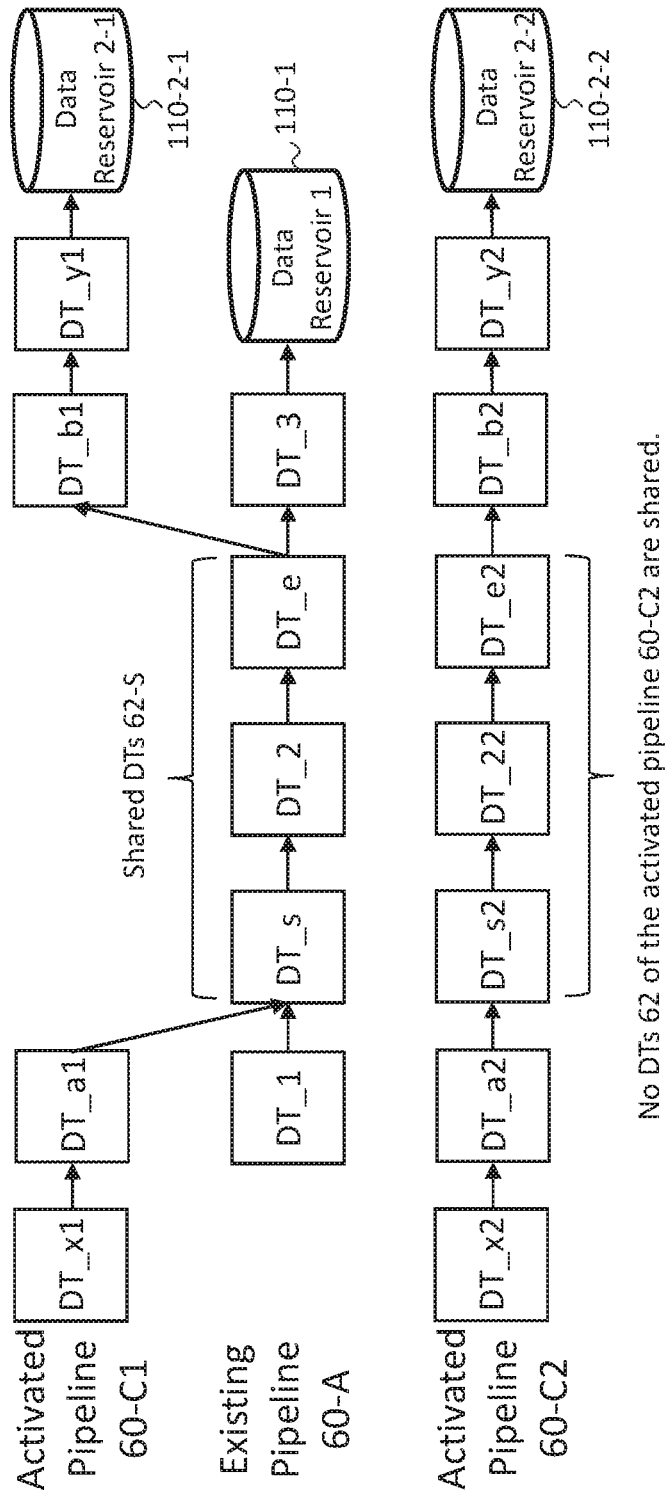
FIG. 9B shows Case No. 1, in which data transformers (DT) 62 are shared between the first activated pipeline 60-C1 and the existing pipeline 60-A, according to an embodiment of the present invention.

FIG. 9B shows Case No. 1, in which data transformers (DT) 62 are shared between the first activated pipeline 60-C1 and the existing pipeline 60-A. Here, DT_S, DT_2, and DT_e of the existing pipeline 60-A may be reused, and DT_S1, DT_21, and DT_e1 of the first activated pipeline 60-C1 may be deleted.

Figure 9C:
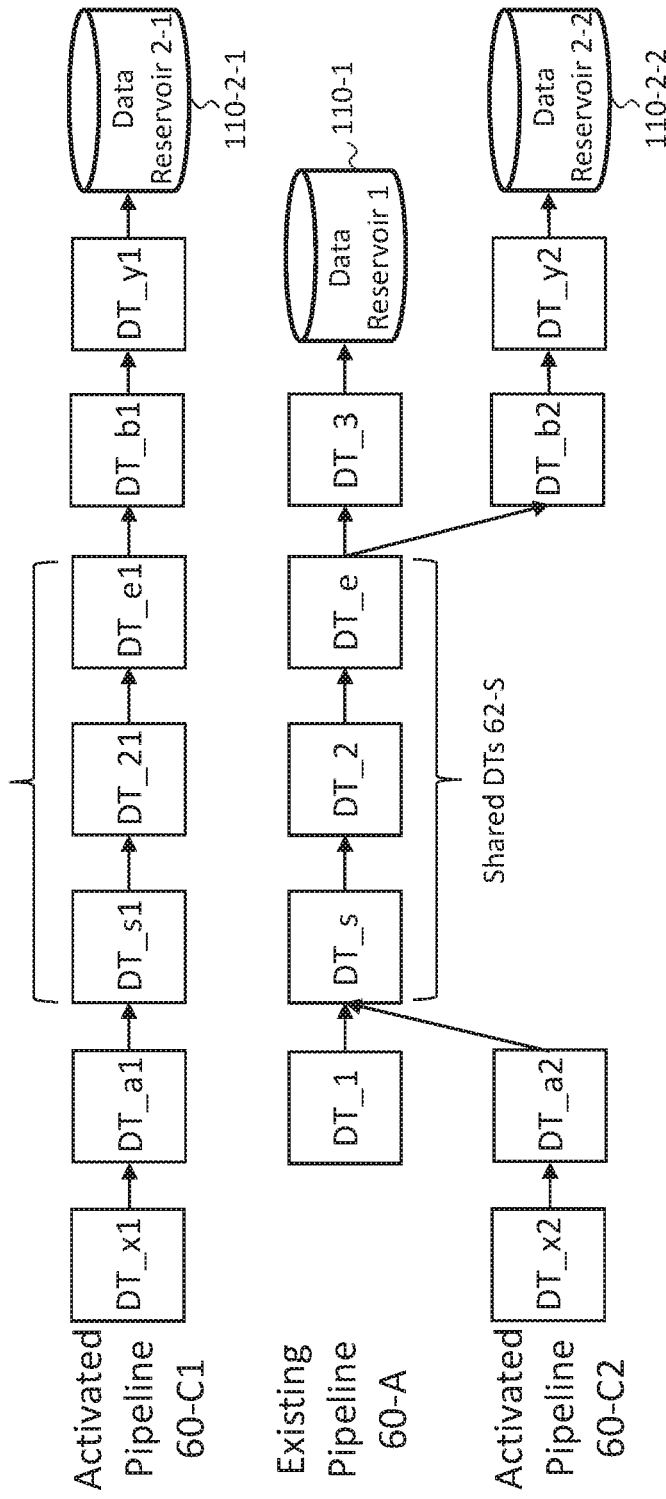
FIG. 9C shows Case No. 2, in which data transformers (DT) 62 are shared between the second activated pipeline 60-C2 and the existing pipeline 60-A, according to an embodiment of the present invention.

FIG. 9C shows Case No. 2, in which data transformers (DT) 62 are shared between the second activated pipeline 60-C2 and the existing pipeline 60-A. Here, DT_S, DT_2, and DT_e of the existing pipeline 60-A may be reused, and DT_S2, DT_22, and DT_e2 of the second activated pipeline 60-C2 may be deleted.

Figure 9D:
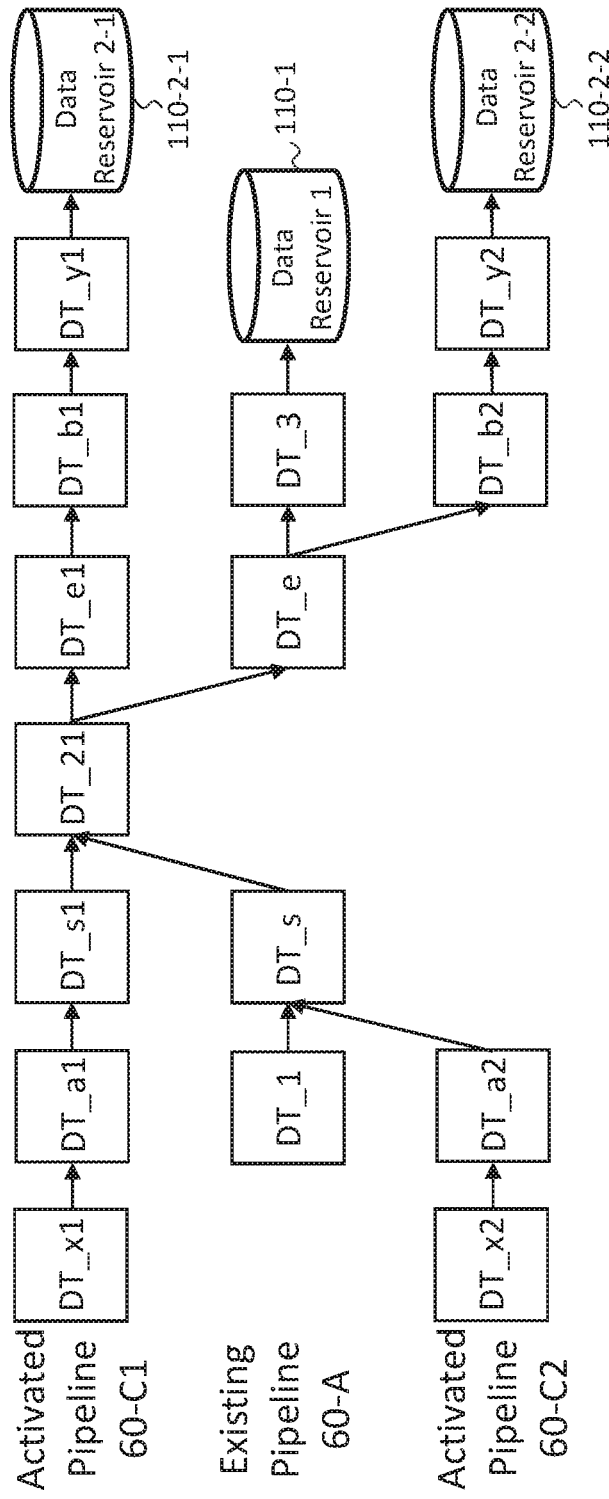
FIG. 9D shows Case No. 3, in which data transformers (DT) 62 are shared between the existing pipeline 60-A and both the first activated pipeline 60-C1 and the second activated pipeline 60-C2, according to an embodiment of the present invention.

FIG. 9D shows Case No. 3, in which data transformers (DT) 62 are shared between the existing pipeline 60-A and both the first activated pipeline 60-C1 and the second activated pipeline 60-C2. In Case No. 3, compared to a case where the shared data transformers (DT) 62-S are selected from either one of the first activated pipeline 60-C1 and the second activated pipeline 60-C2, there is a greater amount of work for changing the connections of the data pipes 64. Therefore, Cases No. 1 and No. 2 are preferable for quickly completing the sharing between the pipelines on demand.

Figure 10:
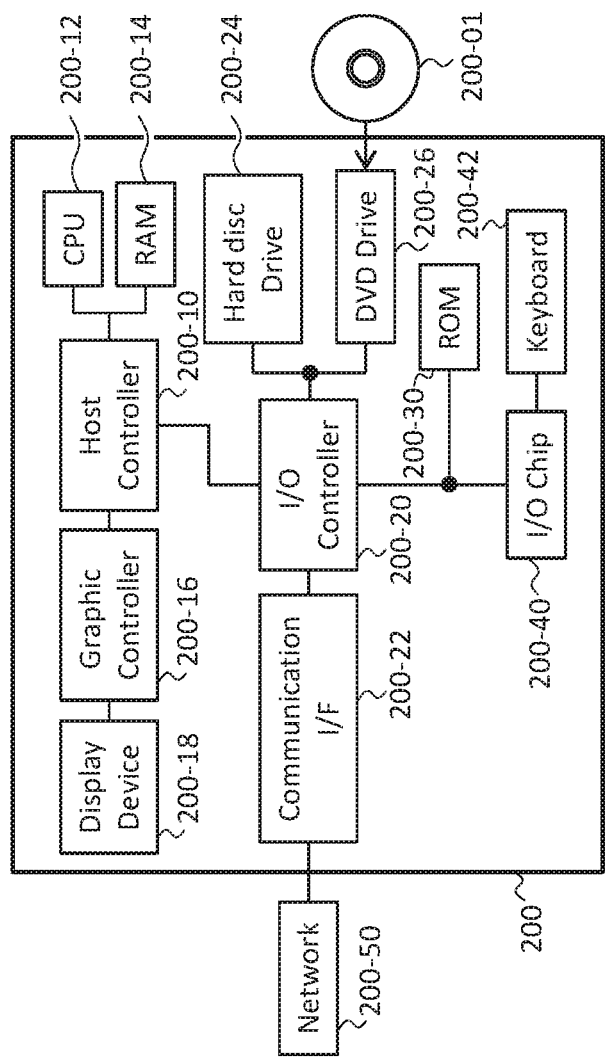
FIG. 10 shows an exemplary hardware configuration of a computer 200 according to an embodiment of the invention.

FIG. 10 shows an exemplary hardware configuration of a computer 200 configured for cloud service utilization, according to an embodiment of the present invention. A program that is installed in the computer 200 can cause the computer 200 to function as or perform operations associated with apparatuses of the embodiments of the present invention or one or more sections (including modules, components, elements, etc.) thereof, and/or cause the computer 200 to perform processes of the embodiments of the present invention or steps thereof. Such a program may be executed by the CPU 200-12 to cause the computer 200 to perform certain operations associated with some or all of the blocks of flowcharts and block diagrams described herein.

The computer 200 according to the present embodiment includes a CPU 200-12, a RAM 200-14, a graphics controller 200-16, and a display device 200-18, which are mutually connected by a host controller 200-10. The computer 200 also includes input/output units such as a communication interface 200-22, a hard disk drive 200-24, a DVD-ROM drive 200-26 and an IC card drive, which are connected to the host controller 200-10 via an input/output controller 200-20. The computer also includes legacy input/output units such as a ROM 200-30 and a keyboard 200-42, which are connected to the input/output controller 200-20 through an input/output chip 200-40.

The CPU 200-12 operates according to programs stored in the ROM 200-30 and the RAM 200-14, thereby controlling each unit. The graphics controller 200-16 obtains image data generated by the CPU 200-12 on a frame buffer or the like provided in the RAM 200-14 or in itself, and causes the image data to be displayed on the display device 200-18.

The communication interface 200-22 communicates with other electronic devices via a network 200-50. The hard disk drive 200-24 stores programs and data used by the CPU 200-12 within the computer 200. The DVD-ROM drive 200-26 reads the programs or the data from the DVD-ROM 200-01, and provides the hard disk drive 200-24 with the programs or the data via the RAM 200-14. The IC card drive reads programs and data from an IC card, and/or writes programs and data into the IC card.

The ROM 200-30 stores therein a boot program or the like executed by the computer 200 at the time of activation, and/or a program depending on the hardware of the computer 200. The input/output chip 200-40 may also connect various input/output units via a parallel port, a serial port, a keyboard port, a mouse port, and the like to the input/output controller 200-20.

A program is provided by computer readable media such as the DVD-ROM 200-01 or the IC card. The program is read from the computer readable media, installed into the hard disk drive 200-24, RAM 200-14, or ROM 200-30, which are also examples of computer readable media, and executed by the CPU 200-12. The information processing described in these programs is read into the computer 200, resulting in cooperation between a program and the above-mentioned various types of hardware resources. An apparatus or method may be constituted by realizing the operation or processing of information in accordance with the usage of the computer 200.

For example, when communication is performed between the computer 200 and an external device, the CPU 200-12 may execute a communication program loaded onto the RAM 200-14 to instruct communication processing to the communication interface 200-22, based on the processing described in the communication program. The communication interface 200-22, under control of the CPU 200-12, reads transmission data stored on a transmission buffering region provided in a recording medium such as the RAM 200-14, the hard disk drive 200-24, the DVD-ROM 200-01, or the IC card, and transmits the read transmission data to network 200-50 or writes reception data received from network 200-50 to a reception buffering region or the like provided on the recording medium.

In addition, the CPU 200-12 may cause all or a necessary portion of a file or a database to be read into the RAM 200-14, the file or the database having been stored in an external recording medium such as the hard disk drive 200-24, the DVD-ROM drive 200-26 (DVD-ROM 200-01), the IC card, etc., and perform various types of processing on the data on the RAM 200-14. The CPU 200-12 may then write back the processed data to the external recording medium.

Various types of information, such as various types of programs, data, tables, and databases, may be stored in the recording medium to undergo information processing. The CPU 200-12 may perform various types of processing on the data read from the RAM 200-14, which includes various types of operations, processing of information, condition judging, conditional branch, unconditional branch, search/replace of information, etc., as described throughout this disclosure and designated by an instruction sequence of programs, and writes the result back to the RAM 200-14. In addition, the CPU 200-12 may search for information in a file, a database, etc., in the recording medium. For example, when a plurality of entries, each having an attribute value of a first attribute is associated with an attribute value of a second attribute, are stored in the recording medium, the CPU 200-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 200. In addition, a recording medium such as a hard disk or a RAM provided in a server system connected to a dedicated communication network or the Internet can be used as the computer readable media, thereby providing the program to the computer 200 via the network.

The present invention may be a system, a method, and/or a computer program product at any possible technical detail level of integration. The computer program product may include a computer-readable non-transitory storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving a request to activate a new pipeline;
   acquiring information relating to shareability of an existing pipeline comprising a first plurality of processing modules, wherein each of the first plurality of processing modules are in an activated state;
   identifying, based on the information relating to shareability, a first shareable processing module from the first plurality of processing modules;
   instantiating a first non-shared processing module for the new pipeline; and
   generating the new pipeline by connecting the first non-shared processing module to the first shareable processing module.

2. The method of claim 1, further comprising:
   acquiring information relating to a current load in at least one processing module of the first plurality of processing modules, wherein identifying the first shareable processing module is based further on the information relating to the current load.

3. The method of claim 1, further comprising:
   acquiring information relating to past actual performance in at least one processing module of the first plurality of processing modules, wherein identifying the first shareable processing module is based further on the information relating to the past actual performance.

4. The method of claim 1, further comprising:
   determining a future expected load of the first shareable processing module, based on a current load of at least one processing module of the first plurality of processing modules upstream from the first shareable processing module, wherein identifying the first shareable processing module is based further on the future expected load of the first shareable processing module.

5. The method of claim 1, further comprising:
   identifying any scheduled stops for each of the first plurality of processing modules; and
   prioritizing each of the first plurality of processing modules for sharing based at least in part on the identified scheduled stops, wherein processing modules scheduled to be stopped are prioritized lower than processing modules not scheduled to be stopped.

6. The method of claim 1, further comprising
   receiving a processing stop command for stopping the existing pipeline;
   stopping at least one of the first plurality of processing modules; and
   causing the first shareable processing module to remain in an activated state.

7. The method of claim 6, wherein the first shareable processing module remains in an activated state until the new pipeline including the first non-shared processing module is separated from the existing pipeline.

8. The method of claim 1, further comprising:
receiving a request for separating the new pipeline from the existing pipeline;
transmitting, to an upstream non-shared processing module at a next upstream position from a furthest-upstream shareable processing module in a shared portion of the existing pipeline, a separation message; and
upon receiving, at a downstream non-shared processing module at a next downstream position from a furthest-downstream shareable processing module in the shared portion of the existing pipeline, the separation message: separating the new pipeline from the existing pipeline.

9. The method according to claim 8, wherein
the upstream non-shared processing module pauses output of processed data to the shared portion of the existing pipeline until the new pipeline is separated from the existing pipeline.

10. A computer program product, the computer program product comprising one or more non-transitory computer-readable storage media and program instructions stored on the one or more computer readable storage media, the program instructions configured to perform an operation comprising:
receiving a request to activate a new pipeline;
acquiring information relating to shareability of an existing pipeline comprising a first plurality of processing modules, wherein each of the first plurality of processing modules are in an activated state;
identifying, based on the information relating to shareability, a first shareable processing module from the first plurality of processing modules;
instantiating a first non-shared processing module for the new pipeline; and
generating the new pipeline by connecting the first non-shared processing module to the first shareable processing module.

11. The computer program product of claim 10, the operation further comprising:
acquiring information relating to a current load in at least one processing module of the first plurality of processing modules, wherein identifying the first shareable processing module is based further on the information relating to the current load.

12. The computer program product of claim 10, the operation further comprising:
acquiring information relating to past actual performance in at least one processing module of the first plurality of processing modules, wherein identifying the first shareable processing module is based further on the information relating to the past actual performance.

13. The computer program product of claim 10, the operation further comprising:
determining a future expected load of the first shareable processing module, based on a current load of at least one processing module of the first plurality of processing modules upstream from the first shareable processing module, wherein identifying the first shareable processing module is based further on the future expected load of the first shareable processing module.

14. The computer program product of claim 10, the operation further comprising:
identifying any scheduled stops for each of the first plurality of processing modules; and
prioritizing each of the first plurality of processing modules for sharing based at least in part on the identified scheduled stops, wherein processing modules scheduled to be stopped are prioritized lower than processing modules not scheduled to be stopped.

15. The computer program product of claim 10, the operation further comprising
receiving a processing stop command for stopping the existing pipeline;
stopping at least one of the first plurality of processing modules; and
causing the first shareable processing module to remain in an activated state.

16. The computer program product of claim 15, wherein the first shareable processing module remains in an activated state until the new pipeline including the first non-shared processing module is separated from the existing pipeline.

17. The computer program product of claim 10, the operation further comprising:
receiving a request for separating the new pipeline from the existing pipeline;
transmitting, to an upstream non-shared processing module at a next upstream position from a furthest-upstream shareable processing module in a shared portion of the existing pipeline, a separation message; and
upon receiving, at a downstream non-shared processing module at a next downstream position from a furthest-downstream shareable processing module in the shared portion of the existing pipeline, the separation message: separating the new pipeline from the existing pipeline.

18. The computer program product of claim 17, wherein
the upstream non-shared processing module pauses output of processed data to the shared portion of the existing pipeline until the new pipeline is separated from the existing pipeline.

19. A computer system comprising one or more computer processors, one or more computer-readable storage media, and program instructions stored on the one or more computer-readable storage media for execution by at least one of the one or more computer processors, the program instructions configured to perform an operation comprising:
receiving a request to activate a new pipeline;
acquiring information relating to shareability of an existing pipeline comprising a first plurality of processing modules, wherein each of the first plurality of processing modules are in an activated state;
identifying, based on the information relating to shareability, a first shareable processing module from the first plurality of processing modules;
instantiating a first non-shared processing module for the new pipeline; and
generating the new pipeline by connecting the first non-shared processing module to the first shareable processing module.

20. The computer system product of claim 19, the operation further comprising:
receiving a request for separating the new pipeline from the existing pipeline;
transmitting, to an upstream non-shared processing module at a next upstream position from a furthest-upstream shareable processing module in a shared portion of the existing pipeline, a separation message; and
upon receiving, at a downstream non-shared processing module at a next downstream position from a furthest-downstream shareable processing module in the shared portion of the existing pipeline, the separation message: separating the new pipeline from the existing pipeline.

* * * * *